(12) United States Patent
Grant et al.

(10) Patent No.: US 7,420,749 B2
(45) Date of Patent: Sep. 2, 2008

(54) OPTICAL ELEMENT DEVICE FOR SIMULATING THE OPTICAL PERSPECTIVE OF ANIMALS, REPTILES, FISH, INSECTS, BIRDS, AND OTHER CREATURES

(76) Inventors: Barra Grant, c/o Leitner Zander, 11611 San Vicente Blvd., Suite 740, Los Angeles, CA (US) 90049; Brian Reilly, c/o Leitner Zander, 11611 San Vicente Blvd., Suite 740, Los Angeles, CA (US) 90049

( * ) Notice: Subject to any disclaimer, the term of this patent is extended or adjusted under 35 U.S.C. 154(b) by 0 days.

(21) Appl. No.: 11/388,457

(22) Filed: Mar. 24, 2006

(65) Prior Publication Data

US 2007/0223100 A1   Sep. 27, 2007

(51) Int. Cl.
  *G02B 13/06* (2006.01)
(52) U.S. Cl. ........................................ 359/725
(58) Field of Classification Search ............... 359/147, 359/725
  See application file for complete search history.

(56) References Cited

U.S. PATENT DOCUMENTS

| | | | | |
|---|---|---|---|---|
| 3,944,358 A | * | 3/1976 | Bergen | 399/178 |
| 4,958,924 A | * | 9/1990 | Parker | 351/57 |
| 5,541,735 A | * | 7/1996 | Rengle | 356/402 |
| 6,206,521 B1 | * | 3/2001 | Kindschuh | 351/175 |
| 6,747,711 B2 | * | 6/2004 | Marshall | 349/15 |
| 2006/0221453 A1 | * | 10/2006 | Koehler et al. | 359/619 |

FOREIGN PATENT DOCUMENTS

GB   2377765 A   *   1/2003

* cited by examiner

*Primary Examiner*—Jordan M. Schwartz
*Assistant Examiner*—James C Jones
(74) *Attorney, Agent, or Firm*—William Propp

(57) ABSTRACT

Optical elements in an optical device simulate the optical perspective of animals, reptiles, fish, insects, birds and other creatures for a human viewer. The optical elements are one or more lenses, filters, diffraction gratings, mirrors, prisms, polarizers or apertures or combinations thereof. The optical device can be a monocle, a monocular, a telescope, binoculars, goggles, a mask, a visor or a helmet. The optical element can be permanently mounted in the optical device. The optical element can be removeably mounted in the optical device. The optical element can be sequentially moved through the optical device.

15 Claims, 25 Drawing Sheets

OPTICAL ELEMENT DEVICE FOR SIMULATING THE OPTICAL PERSPECTIVE OF ANIMALS, REPTILES, FISH, INSECTS, BIRDS, AND OTHER CREATURES

BACKGROUND OF THE INVENTION

This invention relates generally to an optical device having one or more optical elements and, more particularly, this invention is directed to an optical device, which allows the human viewer to simulate the optical perspective of animals, reptiles, fish, insects, birds and other creatures.

Optical elements are often used to correct the distortions in the eyesight of the human viewer. Eyeglasses and contact lenses are classic examples of improving the optical perspective of the human viewer.

Occasionally, optical elements are used to deliberately distort the eyesight of the human viewer. Fresnel lenses in goggles are used to simulate the disorientation caused by intoxication in U.S. Pat. No. 6,206,521. Mis-shapen lenses and mirrors are also used to simulate a drunk or drugged state in the viewer.

A color filter in a monocle in U.S. Pat. No. 5,541,735 allows a hunter to select camouflage clothing to blend into a specific outdoors background during dim light. In this patent, the monocle filters out red since deer and other trophy hunting animals cannot see red. The monocle is used to select camouflage hunting clothing against an outdoors background.

It is an object of this invention to provide an optical device with one or more optical elements, which allows the human viewer to simulate the optical perspective of animals, reptiles, fish, insects, birds and other creatures.

It is another object of the invention to provide an optical device with multiple optical elements, such as lenses, filters, diffraction gratings, mirrors, prisms, polarizers or apertures, in sequence with each optical element allowing the viewer to see the optical perspective of a different animal, reptile, fish, insect or bird in sequence.

SUMMARY OF THE INVENTION

According to the present invention, individual optical elements or combinations of different optical elements can simulate the optical perspective of a different animal, reptile, fish, insect, bird or creature for a human viewer. The types of optical elements would include lenses, filters, diffraction gratings, mirrors, prisms, polarizers or apertures or combinations thereof.

The optical element, whether a single element or multiple elements, is securely held within an optical holder. The optical holder can be permanently mounted in an optical device, removeably mounted in an optical device, or sequentially moved into or within an optical device.

The optical holder will position the optical element within the optical device in the optical path of the light from the outside surrounding environment to the eye of the viewer. The optical element will optically transform the light from the outside surrounding environment to simulate the optical perspective of a different animal, reptile, fish, insect, bird or creature to the eye of the viewer.

There are several different optical devices for the present invention. Each optical device will have at least one configuration for the optical element and the viewer's eye or eyes.

The monocle, the monocular and the telescope will have one optical element for one eye of the viewer. The binoculars and the goggles will have two optical elements with one optical element for each eye of the viewer.

The mask and the visor can have three different optical element configurations. First, the mask and visor can have one optical element for both eyes of the viewer. Second, the mask and visor can have two adjacent optical elements with one optical element for each eye of the viewer. Third, the mask and visor can have two adjacent optical elements with both eyes seeing through the first optical element, or each eye seeing though a different optical element or both eyes seeing through the second optical element depending upon which direction and orientation the eyes are looking; left, center or right respectively.

The helmet can have one optical element for only one eye of the viewer, or two optical elements, one optical element for each eye of the viewer, or one optical element for both eyes of the viewer.

A single optical element in an optical holder can be permanently and non-removeably mounted inside an optical device or at the eyepiece of an optical device. The optical device will use the single optical element to simulate the optical perspective of a single creature.

An optical element in an optical holder can be removeably mounted to the eyepiece or inside the barrel of the optical device. The optical element can be removed and replaced with a different optical element. The optical device can be used for multiple optical elements to simulate the optical perspective of multiple creatures.

The optical element in the optical holder can fit onto the eyepiece or the end of the barrel of the optical device. A slot in the eyepiece or barrel allows the optical element in the optical holder to be inserted into the eyepiece or barrel, fit into position in the optical path and then removed. The optical holder can be configured to properly orient the optical element in the eyepiece or barrel.

One of multiple optical elements is sequentially moved into position in the eyepiece or barrel inside the optical device. The optical element can be moved and replaced with a different optical element. The optical device can in series move multiple optical elements into position. The optical device can be used for multiple optical elements to simulate the optical perspective of multiple creatures.

Multiple optical elements are positioned along the length of a single linear optical holder. The optical holder can fit into parallel and opposing slots in the eyepiece or barrel allowing the multiple optical elements to be sequentially moved into position in the optical path in the eyepiece or barrel inside the optical device. A control knob and a gear can move the linear optical holder in the optical device. A double eyepiece or double barrel optical device can have a single linear optical holder with multiple optical elements positioned across both eyepieces or both barrels.

Multiple optical elements are positioned along the circumferential length of a single circular optical holder. The circular optical holder is mounted on a spindle in the optical device. The circular optical holder will rotate allowing the multiple optical elements to be sequentially moved into position in the optical path in the eyepiece or barrel inside the optical device. A control knob and a gear can move the circular optical holder in the optical device. A double eyepiece or double barrel optical device can have a single circular optical holder with multiple optical elements positioned across both eyepieces or both barrels.

Multiple optical elements are positioned around a common axle in a revolving door configuration. The axle with multiple optical holders is mounted in the optical device. The axle with multiple optical holders will rotate allowing the multiple optical elements to be sequentially moved into position in the optical path in the eyepiece or barrel inside the optical device.

A control knob can rotate the axle with multiple optical holders in the optical device. A double eyepiece or double barrel optical device can have a single axle with multiple optical holders positioned across both eyepieces or both barrels.

Multiple optical elements are positioned along chains held between two axles in a racetrack configuration. The two axles with multiple optical holders are mounted in the optical device. The two axles will rotate the chains allowing the multiple optical elements to be sequentially moved into position in the optical path in the eyepiece or barrel inside the optical device. A control knob can rotate one of the axles in the optical device. A double eyepiece or double barrel optical device can have the two axles with multiple optical holders on chains positioned across both eyepieces or both barrels.

Other aspects of the invention will become apparent from the following more detailed description, taken in conjunction with the accompanying drawings.

BRIEF DESCRIPTION OF THE DRAWINGS

The preferred embodiments of this invention will be described in detail, with reference to the following figures wherein.

DETAILED DESCRIPTION OF PREFERRED EMBODIMENTS

Figure 1:
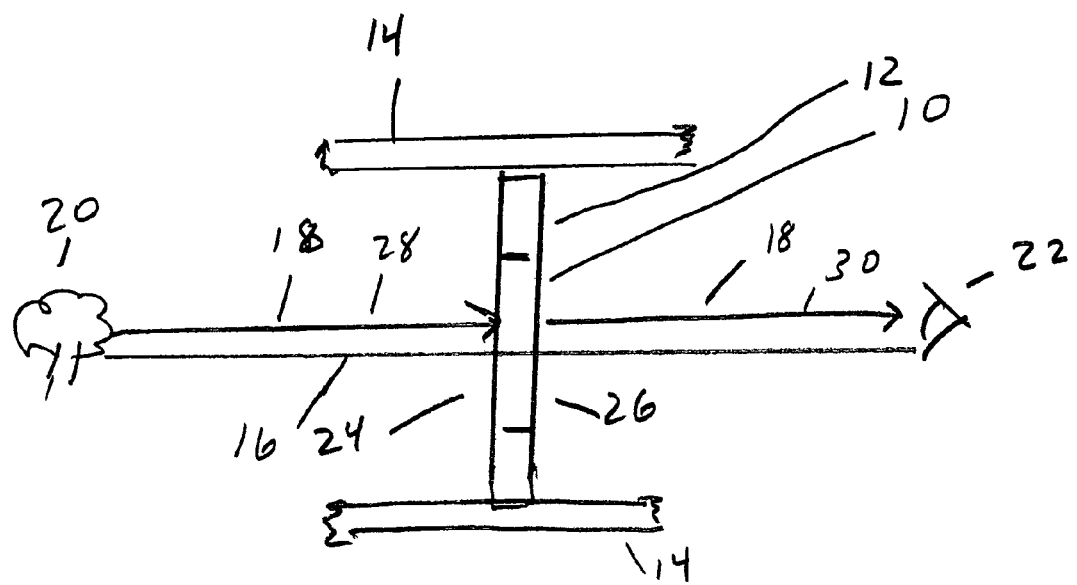
FIG. 1 is a side view of an optical element transforming the light from the outside surrounding environment to simulate the optical perspective of a different animal, reptile, fish, insect, bird or creature to the eye of the viewer of the present invention.

Reference is now made to FIG. 1 illustrating individual optical elements with each different optical element allowing the human viewer to simulate the optical perspective of a different animal, reptile, fish, insect, bird or creature.

Optical Elements

As shown in FIG. 1, the optical element 10, whether a single element or multiple elements, is securely held within an optical holder 12. The optical holder can be permanently mounted in an optical device, removeably mounted in an optical device, or sequentially moved into or within an optical device.

The optical holder 12 will position the optical element 10 within the optical device 14 in the optical path 16 of the light 18 from the outside surrounding environment 20 to the eye 22 of the viewer. The optical element will optically transform the light from the outside surrounding environment to simulate the optical perspective of a different animal, reptile, fish, insect, bird or creature to the eye of the viewer.

The optical element will have an input surface 24 and an output surface 26.

Light 18 from the outside surroundings and environment will be incident upon the input surface 24, which transmits the incident light 28 into the optical element 10. The optical element 10 optically transforms the light. The transformed light 30 exits the optical element through the output surface 26 and is directed to the eye 22 of the viewer.

The optical element is always oriented with the input surface 24 closest and facing the outside surroundings 20 and the output surface 26 closest and facing the eye 22 of the viewer. The optical element is always oriented with the optical element in the optical path 16 of the light between the outside surroundings 20 and the eye 22 of the viewer.

The optical element 10 is always oriented so that the light 28 from the outside surroundings 20 is always first incident on the input surface 24, the incident light will be transformed by the optical element, and the transformed light 30 is directed to the eye 22 of the viewer.

Optical elements or combination of different optical elements can simulate the optical perspective of a different animal, reptile, fish, insect, bird or creature for a human viewer. A spider has eight eyes. The spider has two larger front eyes to see distant objects, two small front eyes to see closer objects and four small side eyes to judge peripheral motion.

The optical elements to simulate the optical perspective of a spider for a human viewer would be two front large magnifying lenses, two front smaller focusing lenses and four side small diffraction gratings. The spider can also see polarized light through its two front eyes so the two front large magnifying lenses should also have a polarizer. Alternately, the two front magnifying lenses can have a polarizing film on the lens' surface. The small diffraction gratings are not focusing lens or even viewing lens but are optically sensitive enough to detect motion.

Alternately, the optical perspective of a spider could be simulated by a lens with concentric elements. The center of the lens would be a magnifying lens with a polarizer or with a polarizing film on the surface of the magnifying lens, the inner concentric ring around the center would be a focusing lens and the outer concentric ring around the inner concentric ring would be a diffraction grating. The lens with concentric elements would approximately simulate the spider's optical perspective while being inexpensive and easier to manufacture.

An insect has a compound eye and views objects and the surroundings as a course mosaic. An ant has 9 compound lenses. A bee has 3,000 to 4,000 compound lenses. A dragonfly has more than 30,000 compound lenses.

The optical element to simulate the optical perspective of an insect for a human viewer would be an array of small convex lenses. The density of the lenses in the array would vary for an ant, a bee or a fly.

A bee's vision is sensitive towards the ultraviolet spectrum. Bees see the surroundings in blue, yellow and ultraviolet. The array of small convex lens would have a blue-sensitive filter separate from the array or a blue-sensitive filter on the lens' surface to simulate a bee's vision.

A dragonfly cannot distinguish blues, violets and ultraviolets. The array of small convex lens would have a yellow-sensitive filter separate from the array or a yellow-sensitive filter on the lens' surface to simulate a dragonfly's vision.

Alternately, the lenses in the array for an insect's optical perspective could be spherical.

Alternately, the lens array could be curved to better focus the light to the eye of the human viewer and to better simulate the hemispherical nature of an insect's eye while still having the optical element meet the space requirements of a shallow depth for the present invention.

Again alternately, the optical element could be a convex lens with a cross-hatch of thick lines separate from the lens or on the lens' surface to simulate the compound lens of the insect. The density of the cross-hatch would vary for an ant, a bee or a fly. The convex lens with cross-hatching would approximately simulate the insect's optical perspective while being inexpensive and easier to manufacture.

The fly's eye lens, which shows the same image repeated over and over, vertically and horizontally, is accurate for the optical perspective of a housefly. The fly's eye lens as an optical element in the present invention can simulate the optical perspective of a fly for a human viewer.

Salt-water fish are sensitive to blue light. The optical element to simulate the optical perspective of a salt-water fish for a human viewer would a blue-sensitive filter.

Freshwater fish are sensitive to red light. The optical element to simulate the optical perspective of a freshwater fish for a human viewer would a red-sensitive filter.

A shark is color-blind and far-sighted. The optical element to simulate the optical perspective of a shark would be a convex lens and a three layer filter or a convex lens with a three layer filter on the convex lens. The three layer filter, which can be in any order, are a blue-sensitive filter, a red-sensitive filter and a green-sensitive filter. These three filters remove all the color from light leaving only black and white. Alternately the three filters can be a magenta-sensitive filter, a cyan-sensitive filter and a yellow-sensitive filter, which also remove all the color from light leaving only black and white.

An octopus or squid has a fixed focus lens and rectangular pupil that contracts to an narrow horizontal slit. An octopus or squid only sees colored light in the blue green spectrum; the rest of the light is viewed as black and white.

An optical element that would simulate the optical perspective of a squid or octopus would be a spherical lens with a short focal length, a blue-sensitive filter and a slit aperture.

A frog has similar eyesight to the squid or octopus. A frog only sees colored light in the blue spectrum and has near spherical eyes to give the frog a panoramic view of its surroundings.

An optical element that would simulate the optical perspective of a frog would be a spherical lens and a blue-sensitive filter.

Turtles are sensitive to colors in the longer wavelengths, yellows, oranges and reds. An optical element that would simulate the optical perspective of a turtle would be a red-sensitive filter or a yellow-sensitive filter.

Crocodiles, alligators and lizards all have a slit pupil and tunnel vision. The tunnel vision allows predators, like crocodiles, alligators and lizards, to focus with fine detail on prey and other objects in their surroundings. An optical element that would simulate the optical perspective of crocodiles, alligators and lizards would be a magnifying lens and a slit aperture.

The eyes of snakes respond to normal light and the sensing pits of the snake next to the eyes respond to the infrared. The infrared perspective means a snake can sense heat, usually the body temperature of its prey. An optical element that would simulate the optical perspective of a snake would be a infrared sensitive filter.

Predator birds, such as hawks, falcons, and eagles, have both strong tunnel vision and excellent peripheral vision. An optical element that would simulate the optical perspective of crocodiles, alligators and lizards would be a lens with concentric elements. The center of the lens would be a magnifying lens with an outer concentric ring of either a prism element or a mirror element. The prism element or the mirror element would collect light from the sides of view and direct the light to the eye of the viewer. This optical element would best be positioned on the eyepiece of the optical device or on the front eyepiece of the barrel of the optical device, as subsequently discussed. The lens with concentric elements would approximately simulate the predator bird's optical perspective while being inexpensive and easier to manufacture.

Seabirds, such as gulls, terns and cormorants, are sensitive to red light, filtering out blues and greens to see objects on the surface or water or underwater and are polarization sensitive to filter out bright sunlight, particularly sunlight reflected off water. An optical element that would simulate the optical perspective of seabirds would be a red-sensitive filter and a polarizer or a red-sensitive filter with a polarizing film on the filter.

Nocturnal birds, such as owls, have tunnel vision and are color-blind. An optical element that would simulate the optical perspective of owls would be a magnifying lens and a three layer filter or a magnifying lens with a three layer filter on the magnifying lens. The three layer filter, which can be in any order, are a blue-sensitive filter, a red-sensitive filter and a green-sensitive filter. These three filters remove all the color from light leaving only black and white. Alternately the three filters can be a magenta-sensitive filter, a cyan-sensitive filter and a yellow-sensitive filter, which also remove all the color from light leaving only black and white.

Hummingbirds are drawn to light in the red spectrum. An optical element that would simulate the optical perspective of a hummingbird would be a red-sensitive filter.

A chicken is near-sighted. An optical element that would simulate the optical perspective of a chicken would be a concave lens.

A pigeon is sensitive to polarized light and sees colored light in the red spectrum, the blue and green light is viewed as black and white. An optical element that would simulate the optical perspective of a pigeon would be a red-sensitive filter and a polarizer or a red-sensitive filter with a polarizing film on the filter's surface.

Dogs, as is popularly known, are color-blind. The optical element to simulate the optical perspective of a dog would be a three layer filter. The three layer filter, which can be in any order, are a blue-sensitive filter, a red-sensitive filter and a green-sensitive filter. These three filters remove all the color from light leaving only black and white. Alternately the three filters can be a magenta-sensitive filter, a cyan-sensitive filter and a yellow-sensitive filter, which also remove all the color from light leaving only black and white.

Cats are slightly near-sighted, have excellent low-light or near darkness vision and have an elliptical pupil, the "cat's eye". The optical element to simulate the optical perspective of a cat would be a convex lens, a red or infrared sensitive filter, and an elliptical aperture. The red or infrared sensitive filter will approximately simulate the optical perspective to see the reds and infrareds necessary to see in low-light or near-darkness, while being inexpensive and easier to manufacture.

Rabbits are typically prey and accordingly have a wide field of vision. The optical element to simulate the optical perspective of a rabbit would be a prism element or a mirror element. The prism element or the mirror element would collect light from the sides of view and direct the light to the eye of the viewer. This optical element would best be positioned on the eyepiece of the optical device or on the front eyepiece of the barrel of the optical device, as subsequently discussed.

Squirrels can only see light in the blue and yellow spectrum and have a wide field of vision. The optical element to simulate the optical perspective of a squirrel would be a blue or yellow sensitive filter and a prism element or a mirror element. The prism element or the mirror element would collect light from the sides of view and direct the light to the eye of the viewer. This optical element would best be positioned on the eyepiece of the optical device or on the front eyepiece of the barrel of the optical device, as subsequently discussed.

Some monkeys are red-green color-blind. The optical element to simulate the optical perspective of a monkey would be a blue or yellow sensitive filter.

Lions and tigers see reduced green, blue and yellow. They do not see red. They do see several shades of grey. The optical element to simulate the optical perspective of a lion or tiger would be a three layer filter. The three layer filter, which can be in any order, are a blue-sensitive filter, a partial red-sensitive filter and a green-sensitive filter. These three filters would remove all the red while allowing some blue, green and yellow light, along with shades of grey (black and white), to pass through to the viewer. Alternately the three filters can be a partial magenta-sensitive filter, a cyan-sensitive filter and a partial yellow-sensitive filter, which also remove all the red while allowing some blue, green and yellow light, along with shades of grey (black and white), to pass through to the viewer.

An elephant is near-sighted. It has trouble seeing faraway objects until they get close. An optical element that would simulate the optical perspective of an elephant would be a concave lens.

A bat is nocturnal and tends to rely on echolocation to determine their position and hunt prey. An optical element that would simulate the optical perspective of an elephant would be an infrared-sensitive filter.

These optical elements are merely illustrative examples of optical elements to simulate the optical perspective of common animals, reptiles, fish, insects, birds and other creatures. The present invention can simulate the optical perspective of other animals, reptiles, fish, insects, birds and creatures.

Similarly, the types of optical elements, such as lenses, filters, diffraction gratings, mirrors, prisms, polarizers or apertures or combinations thereof, are merely illustrative examples of optical elements to simulate the optical perspective of common animals, reptiles, fish, insects, birds and other creatures. Other combinations of these optical elements or other different optical elements can be used to simulate the optical perspective of common animals, reptiles, fish, insects, birds and other creatures.

The term "optical element" as used in the present application refers to a single optical element or multiple optical elements, which achieve the desired effect of the optical element simulating the optical perspective of animals, reptiles, fish, insects, birds and other creatures.

As an illustrative example, the optical element can have two elements, a lens separate from a filter or a lens with a wavelength filter coating on the lens. For ease of understanding the present invention, the optical element is shown as a single element, even though the optical element can have two or more elements or be a combination of different elements.

Optical Devices

There are several different optical devices for the present invention. Each optical device will have at least one configuration for the optical element and the viewer's eye or eyes.

The monocle, the monocular and the telescope will have one optical element for one eye of the viewer.

The binoculars and the goggles will have two optical elements with one optical element for each eye of the viewer.

The mask and the visor can have three different optical element configurations. First, the mask and visor can have one optical element for both eyes of the viewer. Second, the mask and visor can have two adjacent optical elements with one optical element for each eye of the viewer. Third, the mask and visor can have two adjacent optical elements with both eyes seeing through the first optical element, or each eye seeing though a different optical element or both eyes seeing through the second optical element depending upon which direction and orientation the eyes are looking; left, center or right respectively.

The helmet can have one optical element for only one eye of the viewer, or two optical elements, one optical element for each eye of the viewer, or one optical element for both eyes of the viewer.

The optical devices of the present invention can be divided into hand-held and hands-free operation.

The hand-held optical devices would include the monocular, the binoculars, and the telescope. All these optical devices require at least one hand to hold them in position in front of the eye or eyes of the viewer.

The hands-free optical devices would include the goggles, the visor, the mask and the helmet. The goggles, visor and mask can either have a frame, which extends behind the ears of the viewer, or straps, which attach behind the head of the viewer. The helmet will rest on the head of the viewer and may or may not have straps, which attach below the chin of the viewer.

Optical Devices with Optical Elements

There are three series of embodiments of the present invention for an optical device with one or more optical elements. The optical element, such as a lens, a filter, a diffraction grating, a mirror, a prism, a polarizer or an aperture or a combination thereof, allows the human viewer to simulate the optical perspective of animals, reptiles, fish, insects, birds and other creatures.

In the first series of embodiments of the present invention, a single optical element is permanently and non-removeably mounted inside an optical device or at the eyepiece of an optical device. The optical device will use the single optical element to simulate the optical perspective of a single creature.

In the second series of embodiments of the present invention, an optical element can be removeably mounted to the eyepiece or inside the optical device. The optical device can be used for multiple optical elements to simulate the optical perspective of multiple creatures.

In the third series of embodiments of the present invention, one of multiple optical elements is sequentially moved into position in the eyepiece or inside the optical device. The optical device can in series move multiple optical elements into position. The optical device can be used for multiple optical elements to simulate the optical perspective of multiple creatures.

In the first series of embodiments, a single fixed optical element is positioned at the end of the optical device or along the middle of the optical device.

In the second series of embodiments, a removeable optical element is positioned at the end of the optical device or in a slot along the middle of the optical device.

In the third series of embodiments, one or more optical elements are moveable into the optical path at the end of the optical device or along the middle of the optical device.

The terms "endpiece" or "eyepiece" are used interchangeably in the present application.

Monoculars and telescopes have a tubular barrel with an eyepiece at each of the two ends of the barrel. A binocular has two adjacent parallel tubular barrels with an eyepiece at each of the two ends of each of the two barrels.

A monocle, a mask and a visor have a single eyepiece with no barrel. Alternately, the mask and visor can have two eyepieces with no barrel.

Goggles have two eyepieces with no barrel.

A helmet can have a single eyepiece with no barrel, two eyepieces with no barrel, a tubular barrel with an eyepiece at each of the two ends of the barrel or two adjacent parallel tubular barrels with an eyepiece at each of the two ends of each of the two barrels.

In the case of an endpiece, the optical element will be positioned in an optical holder inside the endpiece.

In the case of an eyepiece, the optical element will substitute for the lens or other element inside the endpiece and be positioned in an optical holder inside the endpiece.

The monocle will have a frame supporting a single, generally circular, optical holder. A single optical element will be permanently mounted within the optical holder.

Optical Holder

The optical holder can be physical means to mount and secure the optical element to the optical device.

Figure 2A:
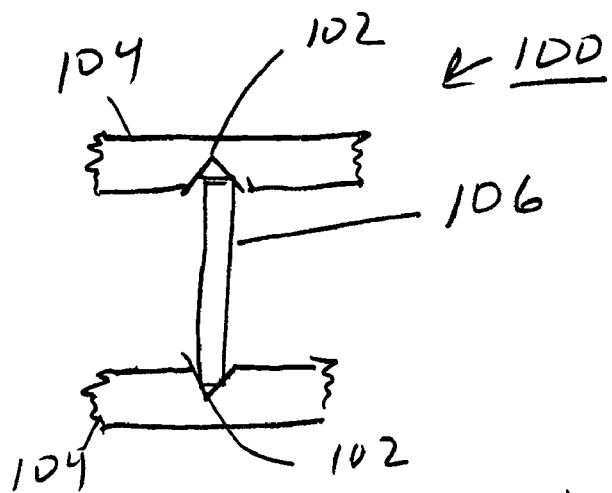
FIG. 2 is a side view of physical means to mount and secure the optical element to the optical device.
Figure 2B:
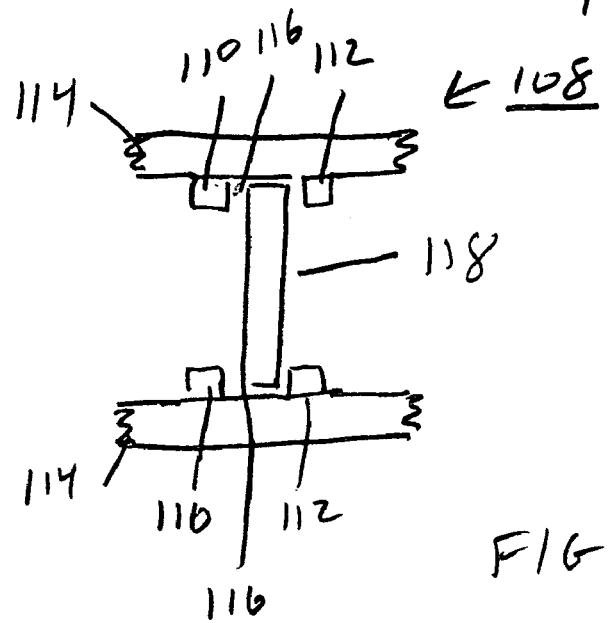
Figure 2C:
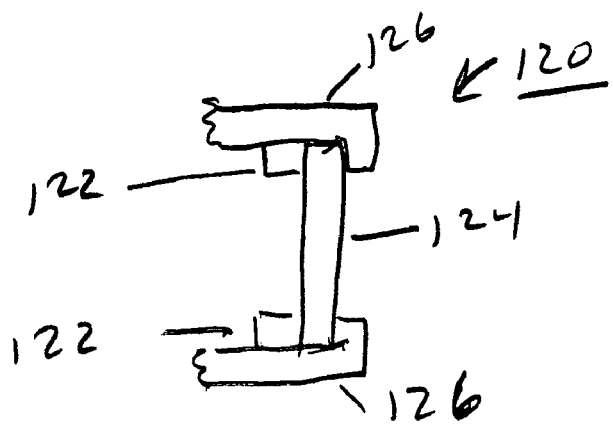

The optical holder 100 of FIG. 2A can be a circular groove 102 in the optical device 104 to hold the circular optical element 106. The optical holder 108 of FIG. 2B can be two circular ridges 110 and 112 in the optical device 114 separated by a space 116 with the circular optical element 118 held in the space by the two ridges. The optical holder 120 of FIG. 2C can be a plug 122 to hold the optical element 124 against the optical device 126.

Figure 2D:
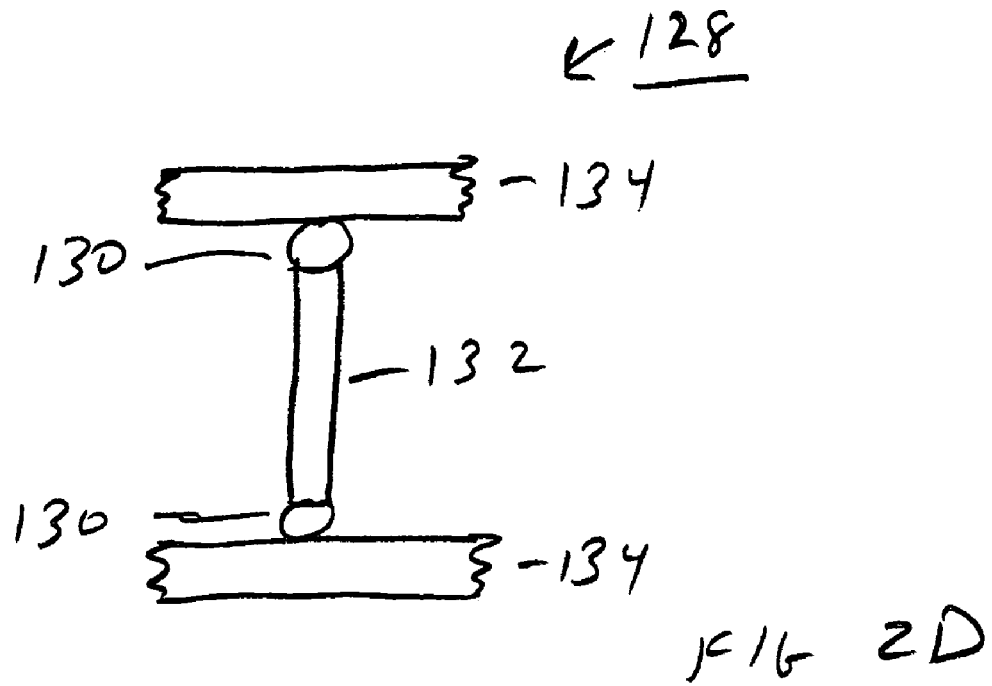

The optical holder 128 of FIG. 2D can be adhesive means 130, such as an adhesive, glue or a chemical bonding agent, to secure the optical element 132 to the optical device 134.

The optical holder can be a combination of an adhesive means, such as an adhesive, glue or a chemical bond, to secure the optical element in a physical means, such as a groove, a pair of ridges or a plug.

Figure 2E:
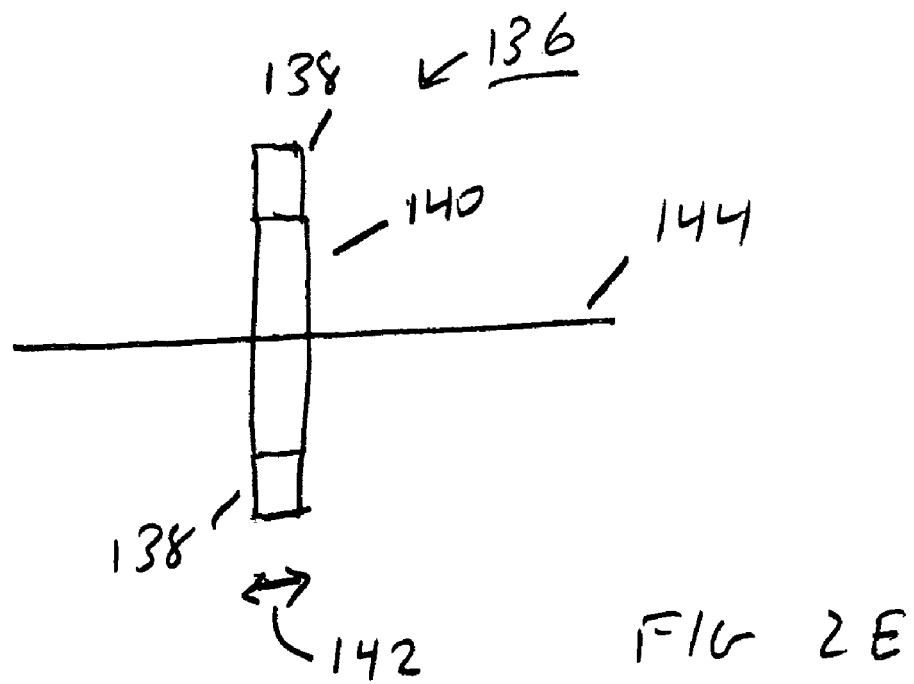

The optical holder 136 of FIG. 2E can be a frame 138. The optical element 140 will be mounted within the optical holder frame 138. The optical element will be secured held within the surrounding frame of the optical holder by the means and methods of an adhesive means and/or physical means previously discussed. The optical element holder will be a rigid material such as a polymer, plastic or metal. The optical element holder will typically have a thin side depth 142 perpendicular to the optical element 140 and optical path 144.

The optical holder will typically be positioned in the eyepiece of an optical device or in the barrel of an optical device.

As noted, a monocle, a mask and a visor have a single eyepiece. Goggles will have two eyepieces. A mask, a visor and a helmet can have two eyepieces. A helmet can have a single eyepiece or two eyepieces.

Figure 3:
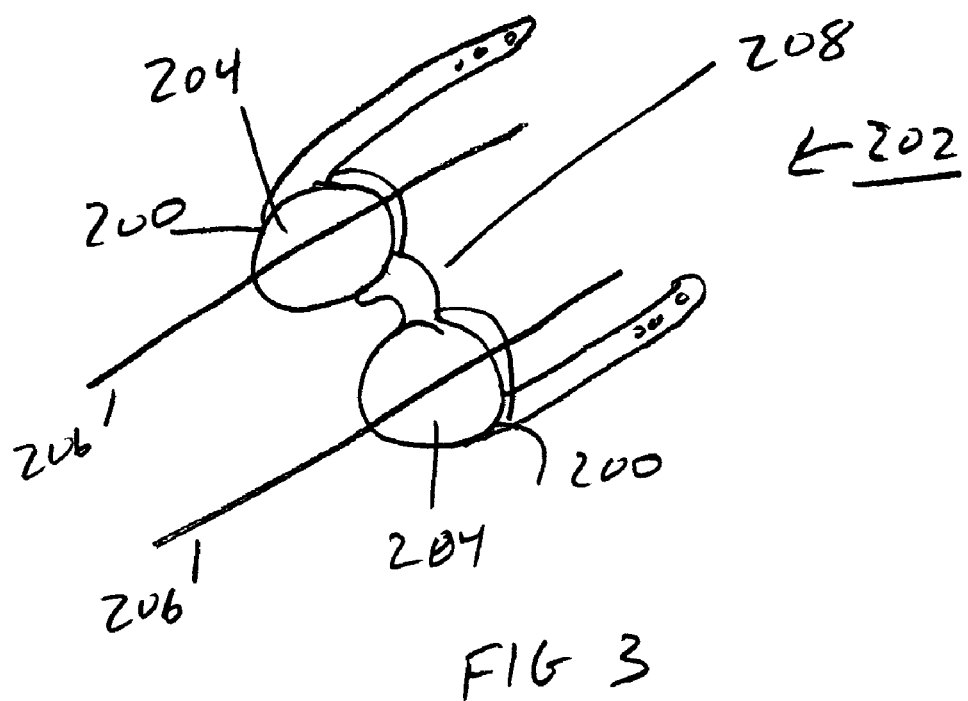
FIG. 3 is a perspective view of the optical holder and optical element substituting for the eyepiece in the optical device.

As shown in FIG. 3, the optical holder 200 will substitute for the eyepiece in the optical device, goggles 202 in this illustrative example. The optical element 204 will be securely held, mounted and positioned, in the optical holder 200 in the optical path 206 of light.

The goggles 202 will have a separate frame 208 supporting two generally circular optical holders 200. The optical holder for the goggles can be the physical means, adhesive means or a combination of both means as discussed previously. A single optical element 204 will be permanently mounted within each optical holder 200. The single optical element will be the same for each optical holder in the goggles.

The visor will have a frame supporting a generally rectangular optical holder. The optical holder for the visor can be the physical means, adhesive means or a combination of both means as discussed previously. A single optical element will be permanently mounted within the optical holder. The visor can also have two adjacent optical elements. One element can be for each eye of the viewer or both eyes can view through the same optical element as the eyes shift.

The mask will have a frame supporting a generally elliptical optical holder. The optical holder for the mask can be the physical means, adhesive means or a combination of both means as discussed previously in the monocle embodiment. A single optical element will be permanently mounted within the optical holder. The mask can also have two adjacent optical elements. One element can be for each eye of the viewer or both eyes can view through the same optical element as the eyes shift.

As seen from these examples the optical holder can vary in shape from geometric shapes to abstract shapes.

The telescope, monocular and binoculars all have at least one generally cylindrical barrel frame with an eyepiece at each end of the barrel.

Figure 4A:
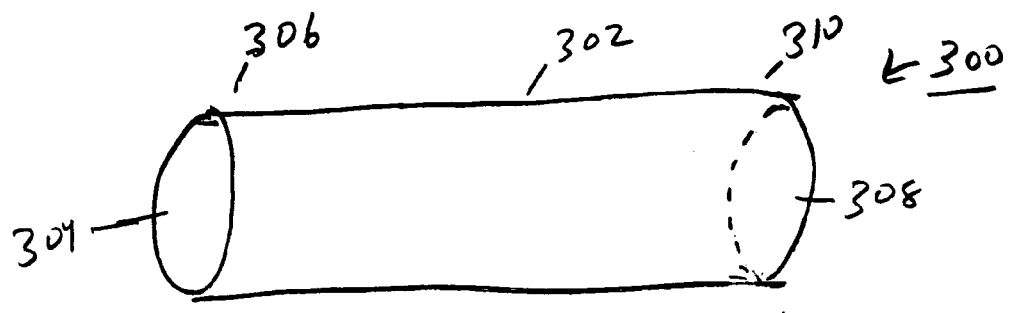
FIG. 4 is a side view of an optical element permanently mounted in a barrel optical device.

The illustrative example of the telescope 300 in FIG. 4A has a single generally cylindrical barrel 302. The barrel has a first eyepiece 304 at the first end 306 of the barrel and a second eyepiece 308 at the second end of the barrel 310. The first end of the barrel is opposite the second end of the barrel along the length 312 of the barrel 302.

Figure 4B:
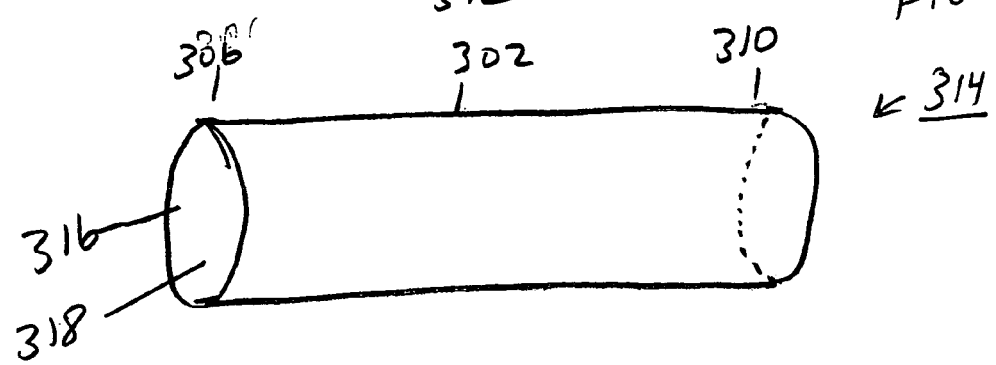

The telescope barrel 314 of FIG. 4B can have an optical holder 316 at the first end 306 of the barrel 302. A single optical element 318 will be permanently mounted within the optical holder 316. The second end 310 of the barrel frame can have no eyepiece, a light transmissive optical element eyepiece with no optical power, or an optical element eyepiece with optical power, such as a magnifying lens.

Figure 4C:
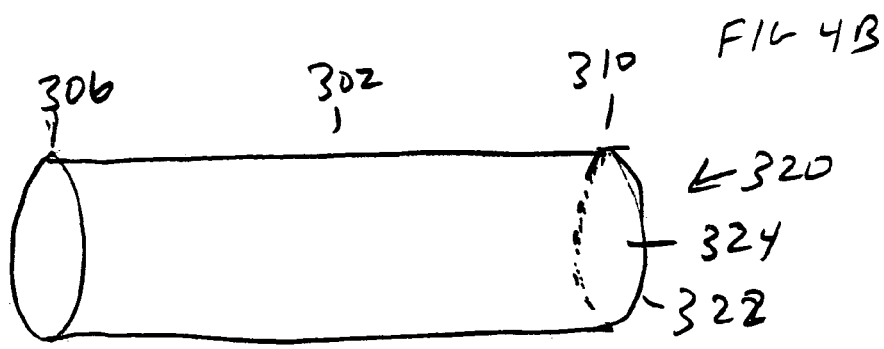

Alternately, the telescope barrel 320 of FIG. 4C can have an optical holder 322 at the second end 310 of the barrel 302. A single optical element 324 will be permanently mounted within the optical holder 322. The first end 306 of the barrel 302 can have no eyepiece, a light transmissive optical element eyepiece with no optical power, or an optical element eyepiece with optical power, such as a magnifying lens.

Figure 4D:
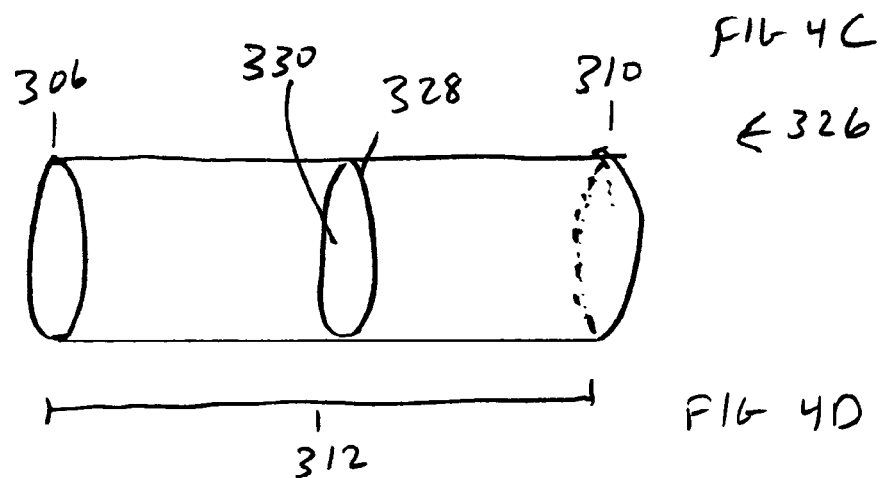

Again, alternately, the telescope barrel 326 of FIG. 4D can have an optical holder 328 positioned along the length 312 of the barrel between the first end 306 and the second end 310 of the barrel. A single optical element 330 will be permanently mounted within the optical holder. The first end 306 and the second end 310 of the barrel 326 can have no eyepiece, a light transmissive optical element eyepiece with no optical power, or an optical element eyepiece with optical power, such as a magnifying lens The monocular also has a generally cylindrical barrel with the single optical element permanently mounted in an optical holder at the positions within the barrel as described for the telescope.

The binoculars have two parallel and adjacent generally cylindrical barrels with two optical elements. A single optical element will be permanently mounted within each optical holder in each of the two barrels. The single optical element will be the same for each optical holder in each barrel. The single optical elements will be mounted in the same positions within each barrel. The single optical element will be mounted in the optical holder at the positions within each barrel as described for the telescope.

The optical element can have a protective coating on its front surface, a protective coating on its back surface or two protective coatings with a first coating on its front surface and a second coating on its back surface. The coating will be light transmissive with no optical power. The coating will protect the optical element from dust, rain, direct sunlight and other adverse outside conditions.

The optical element can have a separate protective element in front of the optical element, a separate protective element behind the optical element or two separate protective elements with a first element in front of the optical element and a second element behind the optical element. The protective element will be light transmissive with no optical power. The protective element will protect the optical element from dust, rain, direct sunlight and other adverse outside conditions.

Alternately, the protective coating and/or the protective element can have optical powers and be part of a multiple element optical element.

The optical element can be any shape but is typically circular, elliptical or rectangular.

In the optical devices with an eyepiece or a barrel, the optical element will usually be circular.

Removeable Optical Holder

The optical holder can position the optical element adjacent to the eyepiece or adjacent to one end of the barrel. The optical element in the optical holder will be in the optical path in the eyepiece or barrel of the light between the outside surroundings and the eye of the viewer.

A flexible member can be used to position the optical holder on the eyepiece or barrel of the optical device.

Figure 5A:
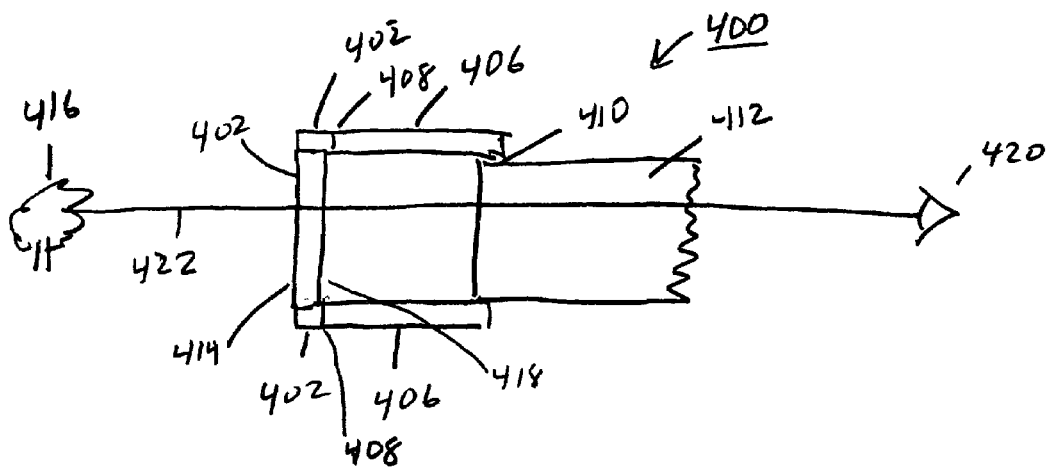
FIG. 5 is a side view of an optical element removeably mounted to the eyepiece of an optical device.

The optical holder 400 of FIG. 5A can be a simple frame 402 to securely mount the optical element 404 with a protruding flexible member 406 along the outer edge 408 of the frame 402. The flexible member can be plastic, rubber, polymer or any other elastic material.

The flexible member 406 extends in at least one direction perpendicular to the plane of the optical element 404 in an L (one direction) or T (two directions) shape with the optical element 404 in the long direction and the flexible member 406 in the short direction. The illustrative example shows the L shape.

The flexible member 406 will then fit around the end-piece 410 of the optical device 412 to securely but removeably grip the end of the optical device.

The optical device 412 can have no optical element or a conventional light-transmissive glass or plastic optical element with no optical power or an optical element with optical power.

The optical element 404 in the optical holder 400 will have its input surface 414 facing towards the outside surroundings 416 and the output surface 418 facing towards the eye 420 of the viewer. The optical element 404 in the optical holder 400 will be in the optical path 422 between the outside surroundings 416 and the eye 420 of the viewer.

The flexible member on the optical holder is shown as circular in cross-section in this embodiment. The eyepieces or barrels on optical devices, such as telescopes, binoculars, monoculars, and goggles, are typically circular.

The flexible member on the optical holder will fit over the outer edge of the optical device eyepiece, securely but removeably fastening the optical element to the optical device.

In the case of a monocular, binoculars or a telescope, the flexible member on the optical holder will fit over the outer eyepiece closest to the outside surroundings and farthest from the eye of the viewer.

If the flexible member on the optical holder fits over the inner eye-piece of a monocular, binoculars or a telescope, then the optical element should either be orientation insensitive or the optical element should be reversed in the optical holder so that the input surface and output surface are correctly oriented in the optical path between the outside surroundings and the eye of the viewer.

The shape of the flexible member on the optical holder conforms to the shape of the optical device, specifically the shape of the eyepiece or barrel. A mask or visor is typically cylindrically or rectangular in shape. The flexible member on the optical holder will correspondingly be cylindrical or rectangular in shape.

The use of the flexible member on the optical holder to attach the optical element to the optical device is merely one illustrative example.

Figure 5B:
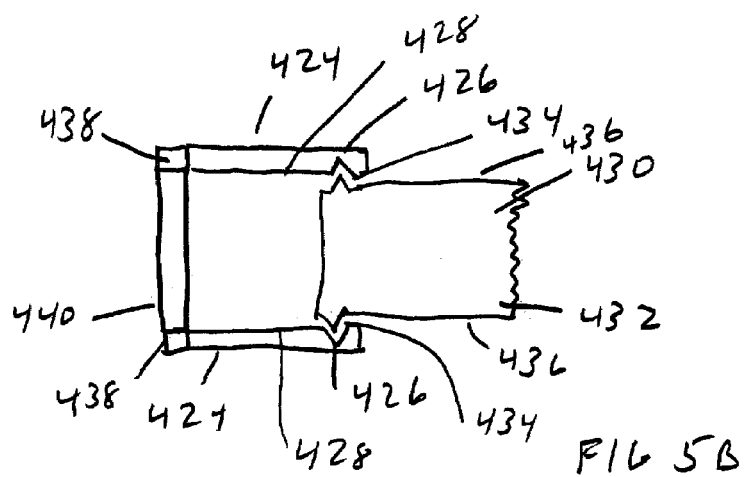

The flexible member 424 of FIG. 5B can have a continuous circumferential groove 426 on the inside 428 of the member. The eyepiece or barrel 430 of the optical device 432 can have a corresponding continuous circumferential ridge 434 on the outside 436 of the eyepiece 438. The groove 426 of the flexible member 424 will fit around the ridge 434 of the eye-piece 436 to secure the optical holder 438 and optical element 440 to the optical device 432. The groove and ridge are shown as circumferential in this illustrative example but need not be. The groove and ridge can be arranged linearly, perpendicular to the lower edge of the flexible member and edge of the eyepiece. The only requirement for the shape and position of the groove and ridge is that they be complementary in shape. Alternately, the groove can be on the eyepiece and the ridge on the flexible member.

The flexible member for the optical holder can be removed by unfastening. The flexible member on another optical holder can then be fit over the outer edge of the optical device eyepiece, securely but removeably fastening a different optical element to the optical device.

The groove and complementary ridge can have other shapes and need not be continuous.

The continuous groove and ridge are symmetrical around the flexible member and optical device eyepiece. Rather than a groove, a non-linear, shaped indentation can be used for the present invention. Rather than a ridge, a non-linear bump, complementary to the indentation can be used for the present invention. A shaped pattern at regularly spaced intervals around the flexible member and optical device eyepiece for the indentation and complementary bump are also symmetrical can be used to securely but removeably mount the optical holder to the optical device.

An irregular pattern or a pattern with irregular spaced intervals or a single pattern will provide a non-symmetrical indentation and complementary bump for the flexible member and optical device eyepiece. A non-symmetrical indentation and complementary bump for the flexible member and optical device eyepiece will precisely position the optical holder on the optical device and precisely position and properly orient the optical element in the optical path of the light from the outside surrounding to the eye of the viewer.

Threaded elements can be used to position the optical holder on the eyepiece or barrel of the optical device.

Figure 5C:
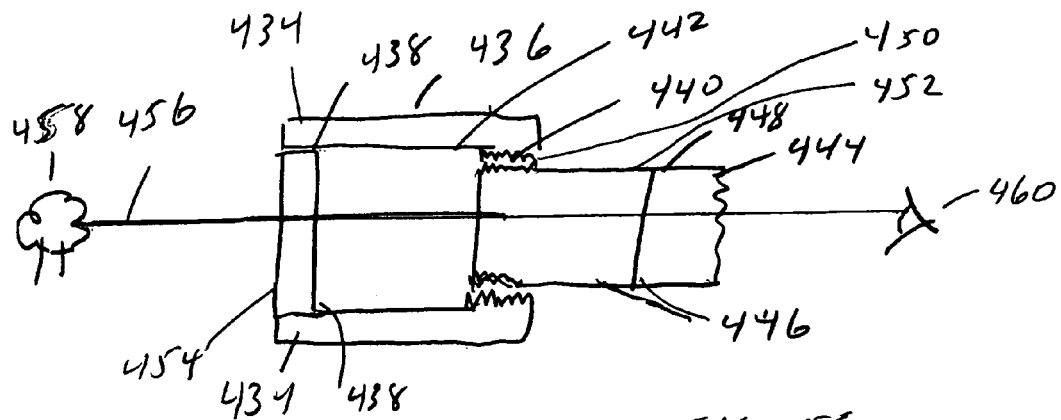

The optical holder 434 of FIG. 5C can have a short depth cylinder 436 extending perpendicularly from the back surface 438 of the optical holder. The cylinder 436 will have male threads 440 on the interior 442 of the cylinder.

The optical device 444 will have a corresponding short depth cylinder 446 extending perpendicularly from the front 448 of the optical device in the examples of monocles, goggles, masks and visors. In the case of a monocular, telescope or binocular, the short depth cylinder will be the front end-piece portion of the optical device cylindrical barrel. The optical device 444 will have female threads 450 on the outside 452 of the optical device cylinder 446. The optical device cylinder 446 will be slightly smaller in diameter than the optical holder cylinder 436. The optical holder and the optical device will have complementary threaded elements.

The optical holder 434 will screw into position on the optical device 444 by the male threads 440 of the optical holder cylinder 436 threading into the female threads 450 of the optical device cylinder 446. The optical element 454 in the optical holder 434 will be in position in the optical path 456 of the light from the outside surroundings 458 to the eye 460 of the viewer viewing through the optical device.

A stop (not shown in the Figure) can be provided in the female threads to prevent further threading and movement of the optical holder relative to the optical device and position the optical element in the optical holder relative to the optical device in the optical path of the light from the outside surroundings to the eye of the viewer.

The optical holder can be screwed by threaded elements onto the optical device for use. The optical holder can be removed by unscrewing from the optical device and another optical holder with a different optical element can be screwed onto the optical device for use.

If the optical holder is screwed into the barrel of the inner eye-piece of a monocular, binoculars or a telescope, then the optical element should either be orientation insensitive or reversed in the optical holder so that the input surface and output surface are correctly oriented in the optical path between the outside surroundings and the eye of the viewer.

Alternately, the threads of the optical holder cylinder can be on the outside of the cylinder with the threads of the optical device cylinder on the inside of the cylinder. The optical device cylinder will be slightly larger in diameter than the optical holder cylinder.

Again alternately, the female threads can be on the optical holder cylinder and the male threads can be on the optical device cylinder.

A post and L-shaped groove can be used to position the optical holder on the eyepiece or barrel of the optical device.

Figure 5D:
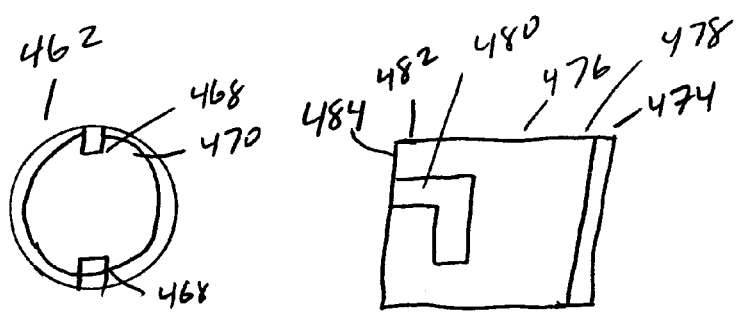
Figure 5E:
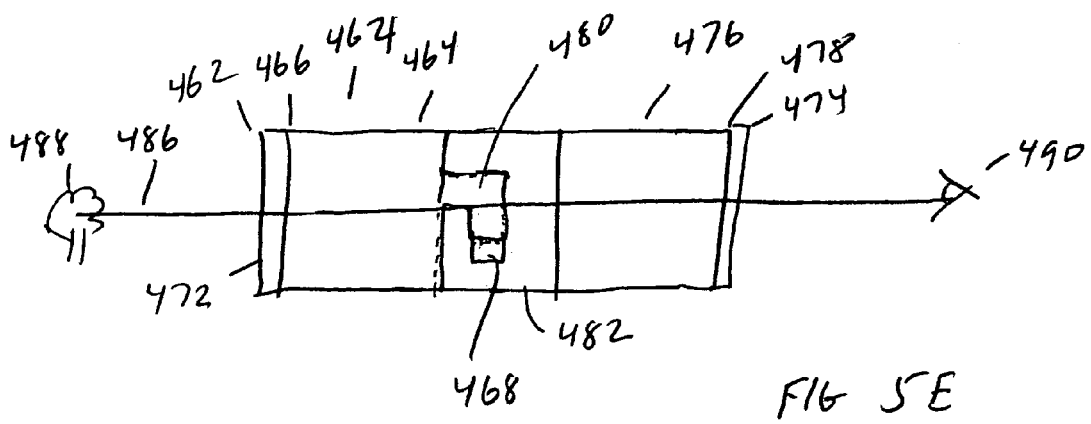

The optical holder 462 of FIGS. 5D and 5E will have a short depth cylinder 464 extending perpendicularly from the back surface 466 of the optical holder. The cylinder 464 will have two short posts 468 extending inward from opposite sides on the interior 470 of the cylinder. The posts are typically oblong rectangular in shape but can be cylindrical or other shapes. The posts will be perpendicular to the cylinder and parallel to the optical element 472 in the optical holder.

The optical device 474 will have a corresponding short depth cylinder 476 extending perpendicularly from the front 478 of the optical device in the examples of monocles, goggles, masks and visors. In the case of a monocular, telescope or binocular, the short depth cylinder will be the front end-piece portion of the optical device cylindrical barrel. The optical device 474 will have two L-shaped grooves 480 on opposite sides of the outside 482 of the optical device cylinder. The groove 480 will extend a first distance vertically (or perpendicular) from the edge 484 of the cylinder then a second distance horizontally (or parallel) to the edge of the cylinder. The optical device cylinder 476 will be slightly smaller in diameter than the optical holder cylinder 464.

The optical holder 462 will be inserted and turned into position in the optical device 474. Each post 468 of the optical holder will be inserted into the vertical portion of the L-shaped groove 480 in the optical device, and then turned into the horizontal portion of the groove to the end of the groove. The optical element 472 will be in position in the optical path 486 of the light from the outside surroundings 488 to the eye 490 of the viewer viewing through the optical device.

The end of the L-shaped groove prevents further movement of the optical holder relative to the optical device and positions the optical element in the optical holder relative to the optical device in the optical path of the light from the outside surroundings to the eye of the viewer.

The optical holder can be inserted and turned in the optical device for use. The optical holder can be removed by turning and lifting from the optical device and another optical holder with a different optical element can be inserted and turned in the optical device for use.

If the optical holder is inserted and turned in the barrel of the inner eyepiece of a monocular, binoculars or a telescope, then the optical element should either be orientation insensitive or reversed in the optical holder so that the input surface and output surface are correctly oriented in the optical path between the outside surroundings and the eye of the viewer.

The optical holder can be removed and another optical holder with a different optical element securely but removeably fastened to the optical device.

Alternately, the posts of the optical holder cylinder can be on the outside of the cylinder with the L-shaped groove of the optical device cylinder on the inside of the cylinder. The optical device cylinder will be slightly larger in diameter than the optical holder cylinder.

Again alternately, the L-shaped grooves can be on the optical holder cylinder and the posts can be on the optical device cylinder.

If the posts and L-shaped grooves are arranged non-symmetrically on the cylinders, then the posts and L-shaped grooves will precisely position the optical holder on the optical device and precisely position and properly orient the optical element in the optical path of the light from the outside surrounding to the eye of the viewer.

Interlocking fins can be used to position the optical holder on the eyepiece or barrel of the optical device.

Figure 5F:
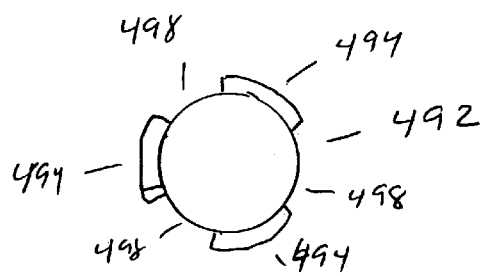
Figure 5G:
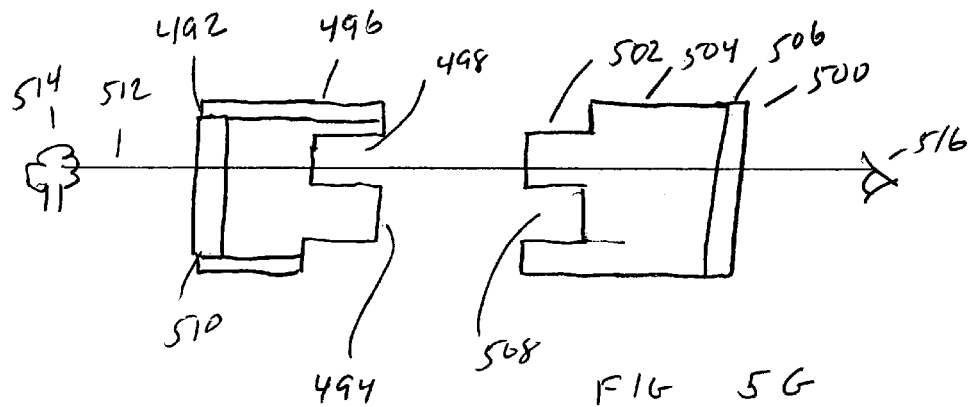

The optical holder 492 of FIGS. 5F and 5G will have multiple fins 494 extending outward from the edges 496 of the optical holder. In this illustrative example, there are three fins. Each fin will alternate with an empty space 498. The fins are typically rectangular but can be trapezoidal in shape with the short parallel side adjacent to the optical holder.

The optical device 500 will have corresponding complimentary fins 502 extending outward from the outer edge 504 of the front end-piece 506 of the optical device. Each fin 502 will alternate with an empty space 508. The optical device 500 will have the same number of fins and empty spaces as the optical holder 492. In this illustrative example, there are three fins. The fins of the optical device will typically be the same shape as the fins of the optical holder. The fins and empty spaces of the optical device are complementary to the fins and empty spaces of the optical holder.

The fins 494 of the optical holder 492 will be inserted into the empty spaces 508 of the optical device 500 while the fins 502 of the optical device 500 will be inserted into the empty spaces 498 of the optical holder 492.

The fins 494 of the optical holder will interlock with the fins 502 of the optical device as both sets of fins splay outward from the optical holder and the optical device. The optical element 510 will be in position in the optical path 512 of the light from the outside surroundings 514 to the eye 516 of the viewer viewing through the optical device.

The insertion of the fins in the empty spaces to the edges of the optical holder and optical device prevents further movement of the optical holder relative to the optical device and positions the optical element in the optical holder relative to the optical device in the optical path of the light from the outside surroundings to the eye of the viewer.

The optical holder can be interlocked in the optical device for use. The optical holder can be removed and another optical holder with a different optical element can be interlocked in the optical device for use.

If the optical holder is inserted in the barrel of the inner eye-piece of a monocular, binoculars or a telescope, then the optical element should either be orientation insensitive or reversed in the optical holder so that the input surface and output surface are correctly oriented in the optical path between the outside surroundings and the eye of the viewer.

If the fins and the empty spaces are arranged non-symmetrically on the optical holder and the optical device or if the fins and the empty spaces have non-symmetrical shapes, then the fins and the empty spaces will precisely position the optical holder on the optical device and precisely position and properly orient the optical element in the optical path of the light from the outside surrounding to the eye of the viewer.

The optical holder can be removed and another optical holder with a different optical element securely but removeably fastened to the optical device.

A bracket and groove can be used to position the optical holder on the eyepiece or barrel of the optical device.

Figure 5H:
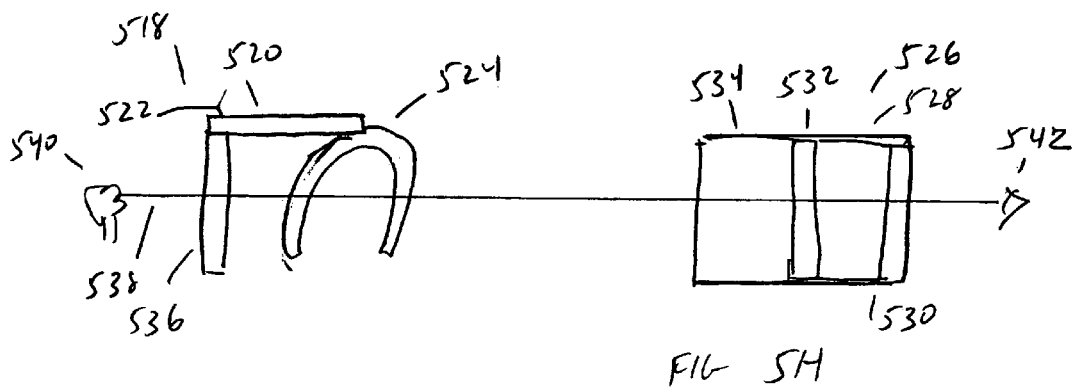

The optical holder 518 of FIG. 5H will have a post 520 extending perpendicularly from the back surface 522 of the optical holder. At the end of the post 520 away from the optical holder 518 will be an open u-shaped bracket 524 extending perpendicular to the post and parallel to the optical element in the optical holder. The bracket can also be a clip or sliding member.

The optical device 526 will have a corresponding short depth cylinder 528 extending perpendicularly from the front 530 of the optical device in the examples of monocles, goggles, masks and visors. In the case of a monocular, telescope or binocular, the short depth cylinder will be the front end-piece portion of the optical device cylindrical barrel. The optical device 526 will have a groove 532 on the outside 534 of the optical device cylinder 528. The groove will extend partially or fully circumferentially around the cylinder. The optical device cylinder will be slightly smaller in diameter than the optical holder cylinder.

The bracket 524 on the optical holder 518 can then slide in and fit in the groove 532 on the optical device cylinder 528, securely but removeably fastening the optical element 536 to the optical device.

The optical element 536 will be in position in the optical path 538 of the light from the outside surroundings 540 to the eye 542 of the viewer viewing through the optical device.

The prior embodiments of FIG. 5 dealt with positioning the optical element in the optical holder at the end of the eyepiece of barrel of the optical device.

The optical element in the optical holder can be removeably mounted inside the eyepiece or inside the barrel of the optical device. The eyepiece or barrel of the optical device will have a slot or opening.

The optical element is securely held within a surrounding optical element holder. The optical element holder will be a rigid material such as a polymer, plastic or metal. The optical element holder will typically have a thin side depth perpendicular to the optical element and optical path.

In the optical devices with an eyepiece or a barrel, the optical element will usually be circular.

Figure 6A:
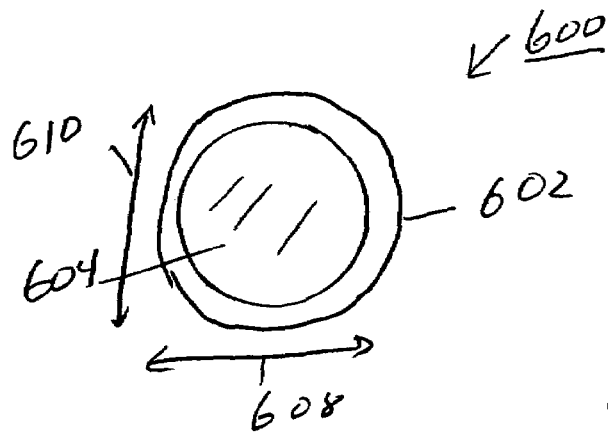
FIG. 6 is front and side views of an optical element being securely held within a circular optical holder.
Figure 6B:
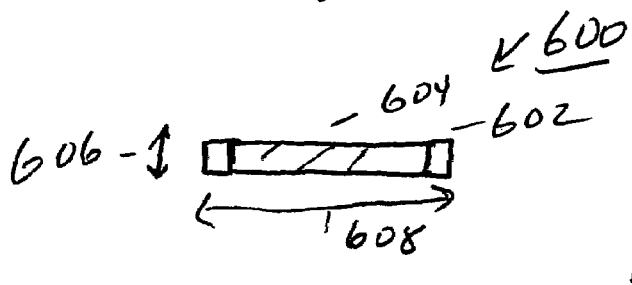

A circular optical holder 600 of FIGS. 6A and 6B can have a frame 602 securely holding the circular optical element 604. The frame will be a rigid material such as a polymer, plastic or metal. The optical holder 600 will generally have a short depth 606 and be generally rectangular in cross-section along the width 608 and depth 606. The optical holder 600 and the optical element 604 will be circular in cross-section along the width 608 and length 610.

Figure 7A:
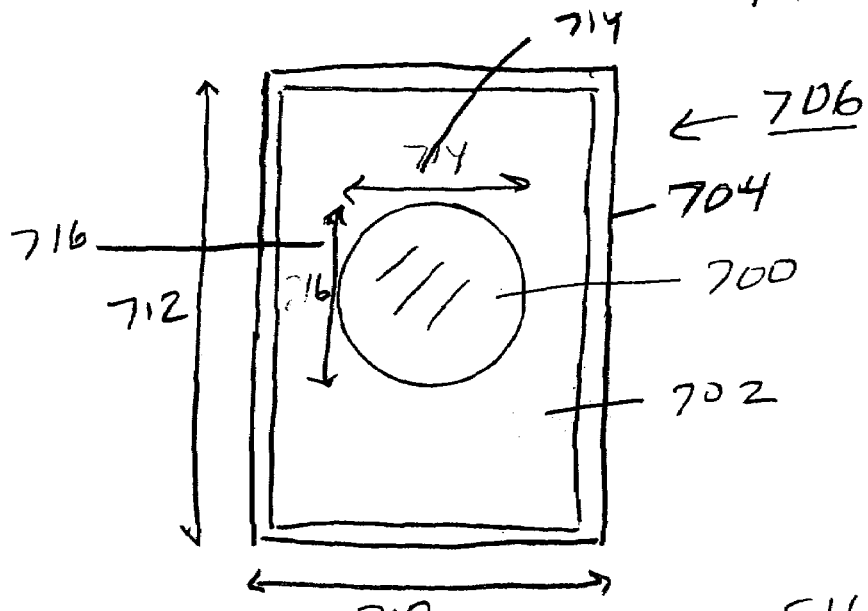
FIG. 7 is front and side views of an optical element being securely held within a rectangular optical holder.
Figure 7B:
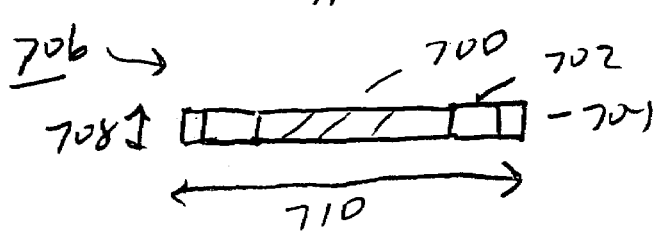

Alternately, the optical element 700 of FIGS. 7A and 7B can be surrounded and securely held by supporting material 702, which is securely held within the rectangular frame 704 of the optical holder 706. The frame will be a rigid material such as a polymer, plastic or metal. The supporting material will also be a rigid material such as a polymer, plastic or metal. The supporting material need not be the same rigid material as the frame. The optical holder 706 will generally have a short depth 708 and be generally rectangular in cross-section along the width 710 and depth 708. The optical holder 706 will be rectangular in cross-section across the width 710 and length 712 while the enclosed optical element 700 will be circular in cross-section along its width 714 and length 716.

Figure 8A:
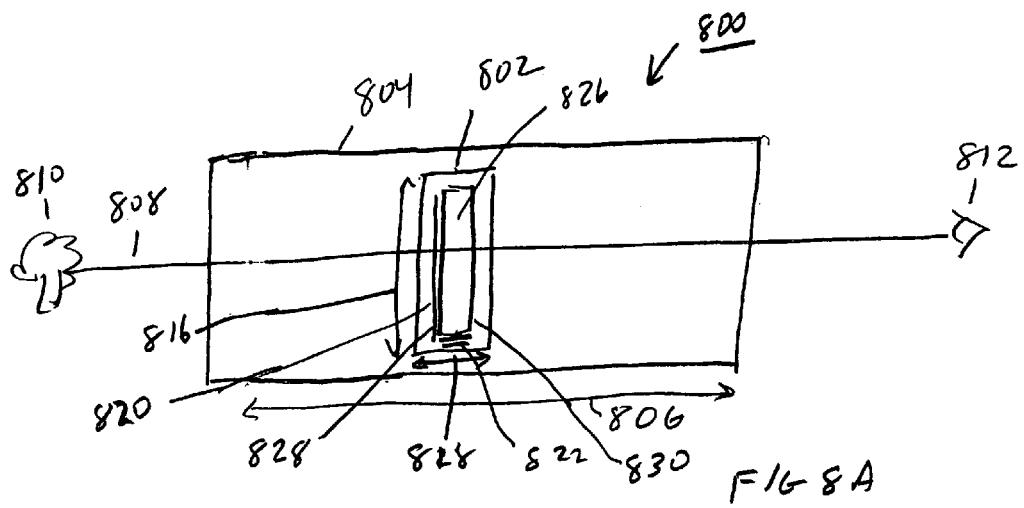
FIG. 8 is side and front views of an optical element removeably mounted into a slot in the barrel of an optical device.
Figure 8B:
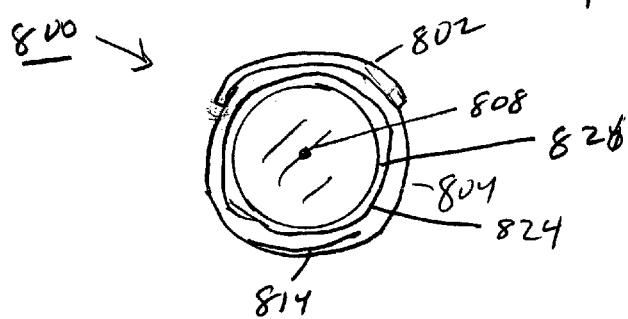

The optical device 800 of FIGS. 8A and 8B will have a slot 802 in the eyepiece or the barrel 804. A barrel is shown in the Figure. The slot 802 is a generally rectangular opening in shape. The slot 802 is positioned along the length 806 of the eyepiece or barrel 804. The optical path 808 of the light in the optical device 800 between the outside surroundings 810 and the viewer's eye 812 is between the slot 802 and back inner surface 814 in the optical device. The slot is generally perpendicular to the optical path and directly opposite the back inner surface of the optical device.

The width 816 and depth 818 of the slot 802 of the optical device is slightly larger than the width 820 and depth 822 of the optical holder 824 with the optical element 826. As noted, generally the optical holder will have a rectangular cross-section along its width and depth and the optical device slot will have a slightly larger rectangular opening.

The circular optical holder 824 (which is the same as the circular optical holder 600 of FIGS. 6A and 6B) can be inserted in the slot 802 in the optical device 800. The optical holder inside the slot in the optical device will position the optical element 826 in the optical holder in the optical path of the light from the outside surroundings to the eye of the viewer. The optical element 826 will be positioned with the input surface 828 of the optical element closest and facing to the outside surroundings 810 and the output surface 830 closest and facing to the eye 812 of the viewer.

The optical holder can be removed from the slot. Another optical holder with a different optical element can then be inserted into the slot in the optical device so that the different optical element is in the optical path inside the optical device. The optical device can be used for multiple optical elements to simulate the optical perspective of multiple creatures.

The optical element in the optical holder can be removeably mounted to the eyepiece or inside the optical device. The optical element in the optical holder is easily inserted through the slot into the eyepiece or barrel of the optical device, securely fits positioned in the optical path inside the optical device and easily removed from the slot and from the eyepiece or barrel of the optical device.

In any embodiment, the optical element holder will be shape specific in its width, length and depth so as to fit securely within a complementary shape specific opening in the optical device. The slot in the optical device is of complementary shape to the optical holder but with slightly larger dimensions (width, length and depth) to allow the optical holder to fit securely but removeably within the slot.

The slot may have a clasp, a clip, or a roughed surface to engage the optical holder to temporarily, securely but removeably, hold the optical holder within the slot. Alternately the temporary engagement means can be on the optical holder or on both the optical holder and the slot.

Figure 9:
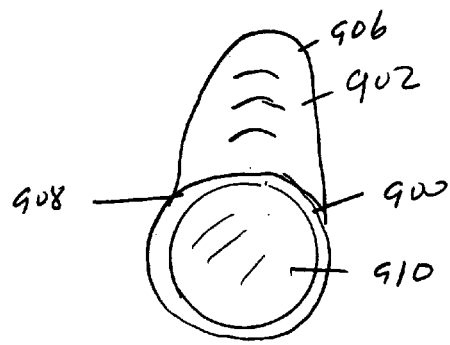
FIG. 9 is a front view of an optical holder with finger grips.

For ease of fitting the optical holder in the slot and for ease of removing the optical holder from the slot, the optical holder 900 of FIG. 9 can have finger grips 902. The grips can be ridges 904 on the first front surface 906 and the second back surface of the optical holder close to the top side 908 of the optical holder. The ridges in this illustrative example are a series of roughly semicircular ridges in the shape of a finger or thumb. The ridges on the surfaces of the optical holder aid in the viewer's fingers being able to grasping and gripping the optical holder to fit the optical holder into the slot or remove the optical holder from the slot, particularly without touching the optical element 910 in the optical holder 900.

Figure 10A:
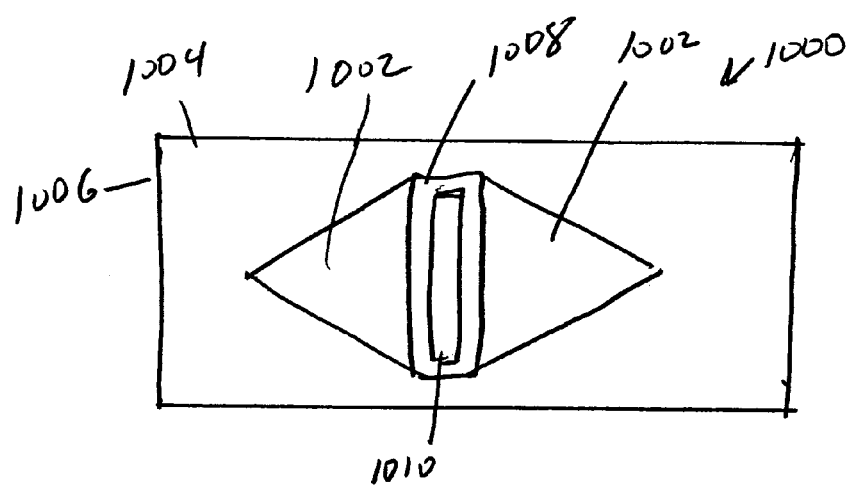
FIG. 10 is a side and front view of an optical barrel with grooves to aid in gripping the optical holder.
Figure 10B:
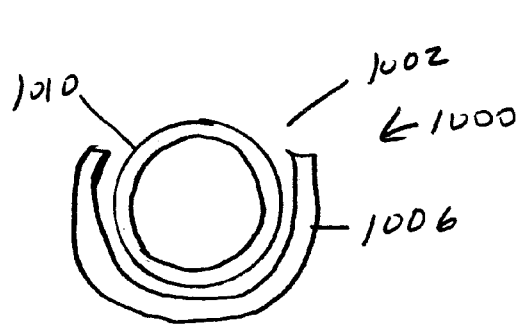

The optical device 1000 of FIGS. 10A and 10B can have grooves 1002 in the outer surface 1004 of the barrel 1006 or eyepiece adjacent to the slot 1008. In this example, the grooves 1002 are semi-conical with the widest and deepest area adjacent to the slot. The grooves in the outer surface of the optical holder adjacent to the slot aid in the viewer's fingers being able to grasp and grip the optical holder 1010 to fit the optical holder into the slot or remove the optical holder from the slot.

The optical element should be properly oriented in the optical path in the optical device.

The optical element in the optical holder can end up reversed, upside down or reversed and upside down when positioned in the optical device.

A wavelength filter is generally orientation insensitive. A diffraction grating and polarizer are also usually orientation insensitive but some may require a proper orientation. A lens is typically orientation sensitive. Compound optical element groups are also generally orientation sensitive.

The two sided optical holder has 3 axises (x, y and z; width, depth and length) of orientation. There are six possible orientations to fit the optical holder within the slot. The viewer can position, remove and reposition the optical holder within the slot until the viewer finds the correct orientation to orient the optical element on the optical holder.

Alternately, written or pictogram directions can be provided on the optical holder or on the optical device or separate from the optical holder and the optical device to orient the optical holder into the slot in the optical device in the correct optical alignment. However, the most practical embodiment of the present invention is to have the optical holder fit inside the slot in the optical device in only one orientation which places the optical element in the optical path of the light from the outside surroundings to the eye of the viewer.

Figure 11:
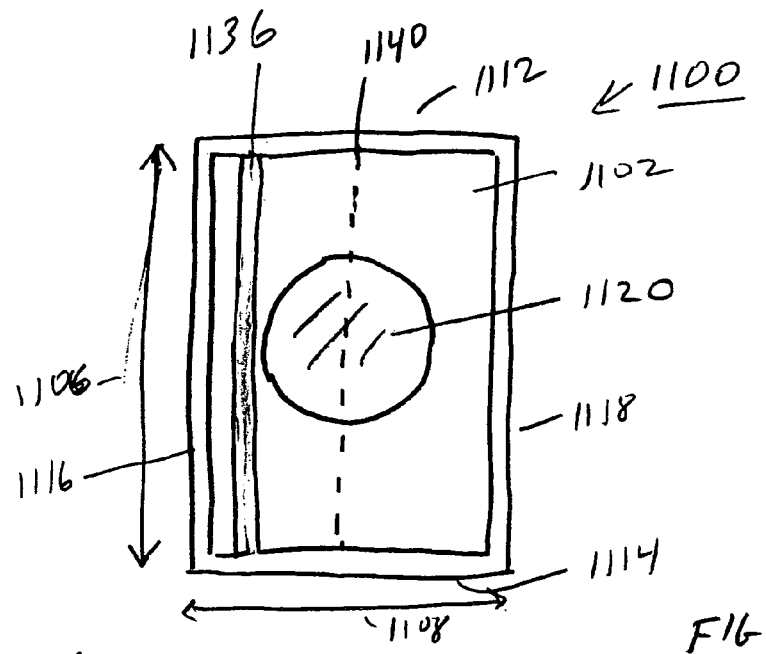
FIG. 11 is a front and side view of an optical holder and slot in a barrel of the optical device to permit only one orientation of the holder in the slot.
Figure 11:
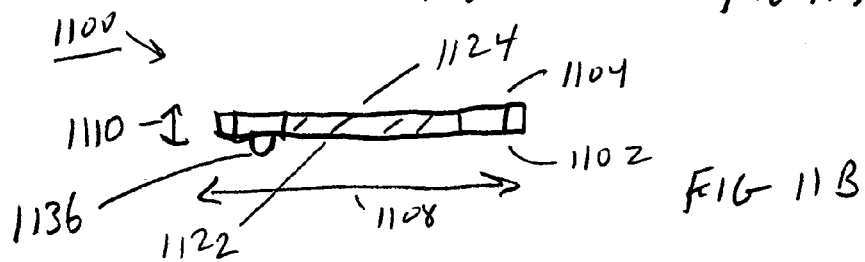
Figure 11C:
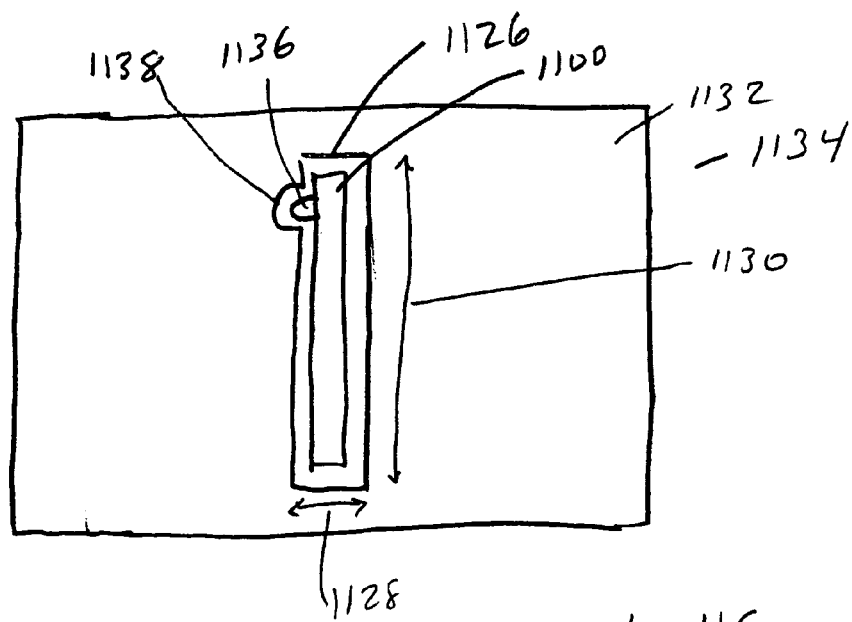

The optical holder 1100 of FIGS. 11A, 11B and 11C will have a first front flat rectangular surface 1102 and a second back flat rectangular surface 1104 along the length 1106 and width 1108 of the optical holder. The first and second flat rectangular surfaces 1102 and 1104 are parallel and spaced apart by the four sides. The sides are along the depth 1110 of the optical holder. The top side 1112 and the bottom side 1114 are parallel and along the short width 1108 of the rectangular surfaces. The left side 1116 and the right side 1118 are parallel and along the long length 1106 of the rectangular surfaces.

The optical element 1120 is generally centered in the optical holder 1100 between the first front flat rectangular surface 1102 and the second back flat rectangular surface 1104 extending through the depth 1110 of the optical holder. The input surface 1122 of the optical element is on the first front flat rectangular surface 1102 and the output surface 1124 of the optical element is on the second back flat rectangular surface 1104.

The rectangular shape of the optical holder 1100 and the slot 1126 will restrict one axis of orientation. The slot 1126 has a short width 1128 and longer length 1130 opening in the surface 1132 of the optical device 1134. The optical holder 1100 can only fit its shorter width 1108 into the slot opening 1126. The longer length 1106 of the optical holder 1100 will not fit lengthwise into the shorter slot opening 1126.

A single ridge 1136 will extend from the top side 1112 along the length 1106 of the first surface 1102 to the bottom side 1104 of the optical holder 1100 offset from the center line 1140 of the optical holder. The optical element 1120 is usually centered in the width 1108 and length 1106 of the first surface 1102 of the optical holder. The single ridge does not intersect physically not interfere optically with the optical element.

A single corresponding groove 1138 extends from the slot opening 1126 along the length 1130 of the inside first surface of the slot. The groove 1138 in the slot 1126 is complementary to the ridge 1136 on the optical holder 1110.

The single ridge offset from the center line on one surface of the optical holder with the corresponding single groove restricts the other two axises of orientation. This design restricts the optical holder to one, and only one, orientation to fit inside the slot in the optical device.

The ridge can be on the right or left side of the optical holder with the groove in the corresponding position in the slot.

Alternately, the ridge can extend from the top side partially along the length of the first surface of the optical holder offset from the center line of the optical holder. The ridge will not extend to the bottom side of the optical holder. The groove in the slot will extend from the slot opening partially along the length of the inside first surface of the slot. The partial groove in the slot is complementary to the partial ridge on the optical holder.

Alternately, the single ridge can extend partially or fully along the length of the second surface.

Alternately, in any of theses configurations, a single groove can be on the optical holder, extending from the top side partially or fully along the length of the optical holder, offset from the center line. The corresponding single ridge will be in the slot, extending from the slot opening partially or fully along the length of the slot. The groove in the optical holder will be complementary to the ridge in the slot.

Linear Optical Holder with Multiple Optical Elements

A linear array of multiple optical elements can be removeably mounted in the eyepiece or the barrel inside the optical device. The multiple optical elements in the optical device of the present invention will simulate, one at a time, the optical perspective of multiple creatures to the viewer.

Figure 12A:
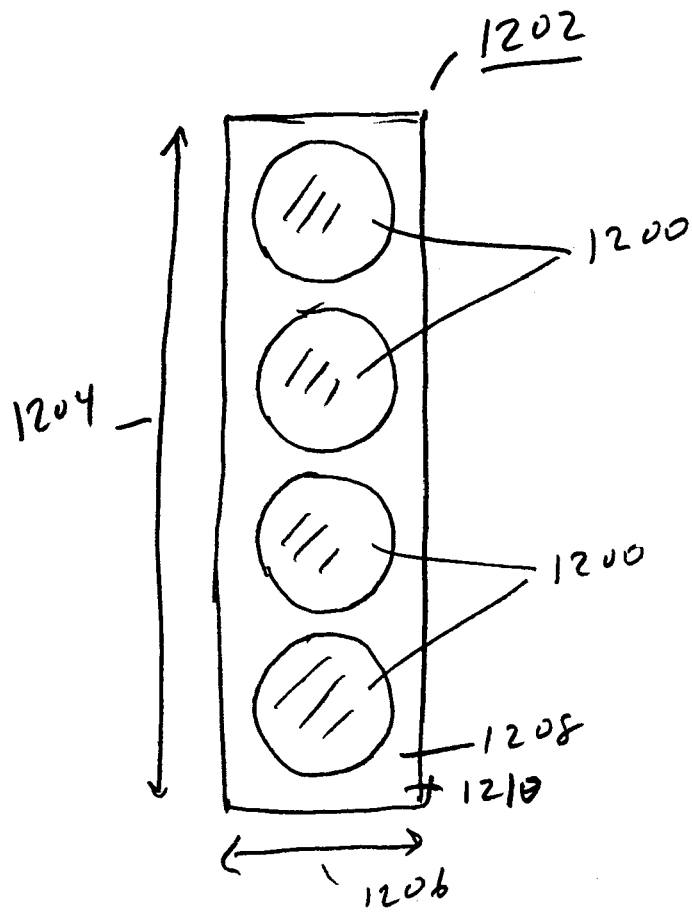
FIG. 12 is a front and side view of a linear optical holder of multiple optical elements removeably mounted in a barrel of an optical device.
Figure 12B:
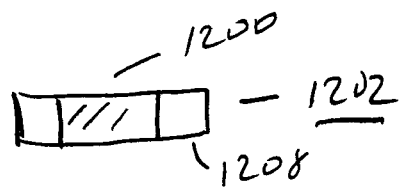

Multiple optical elements 1200 in FIGS. 12A and 12B are positioned in a single parallel series along the length of a single common optical holder 1202. The optical holder can be any shape but is typically rectangular in length 1204 and width 1206. The optical holder 1202 can have the optical elements 1200 surrounded and securely held by supporting material 1208, which is securely held within the rectangular frame 1210 of the optical holder or can have a frame securely holding the optical elements. The frame will be a rigid material such as a polymer, plastic or metal. The supporting material will also be a rigid material such as a polymer, plastic or metal. The supporting material need not be the same rigid material as the frame. The optical holder will generally have a short depth and be generally rectangular in cross-section along the width and depth.

Figure 12C:
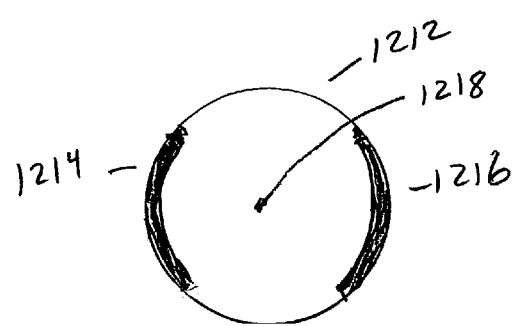
Figure 12D:
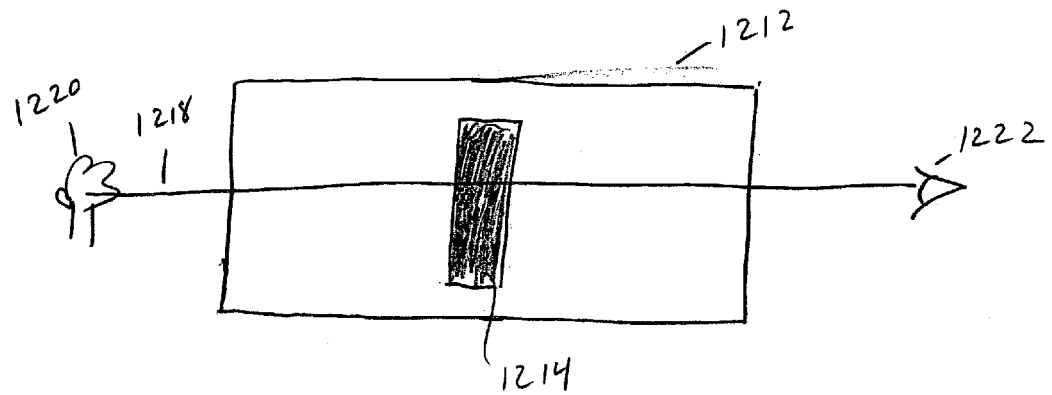

The optical device 1212 of FIGS. 12C and 12D will have a first slot 1214 and a second slot 1216. The first and second slots are generally rectangular openings in shape. The first slot 1214 is opposite and parallel to the second slot 1216 in the optical device 1212. The optical path 1218 of the light in the optical device 1212 between the outside surroundings 1220 and the viewer's eye 1222 is between the first slot 1214 and the second slot 1216 in the optical device 1212. The first and second slots are generally perpendicular to the optical path.

The width and depth of the first and second slots 1214 and 1216 of the optical device are slightly larger than the width and depth of the single common optical holder 1202 with the multiple optical elements 1200. As noted, generally the optical holder will have a rectangular cross-section along its width and depth and the optical device slots will have a slightly larger rectangular opening.

Figure 12E:
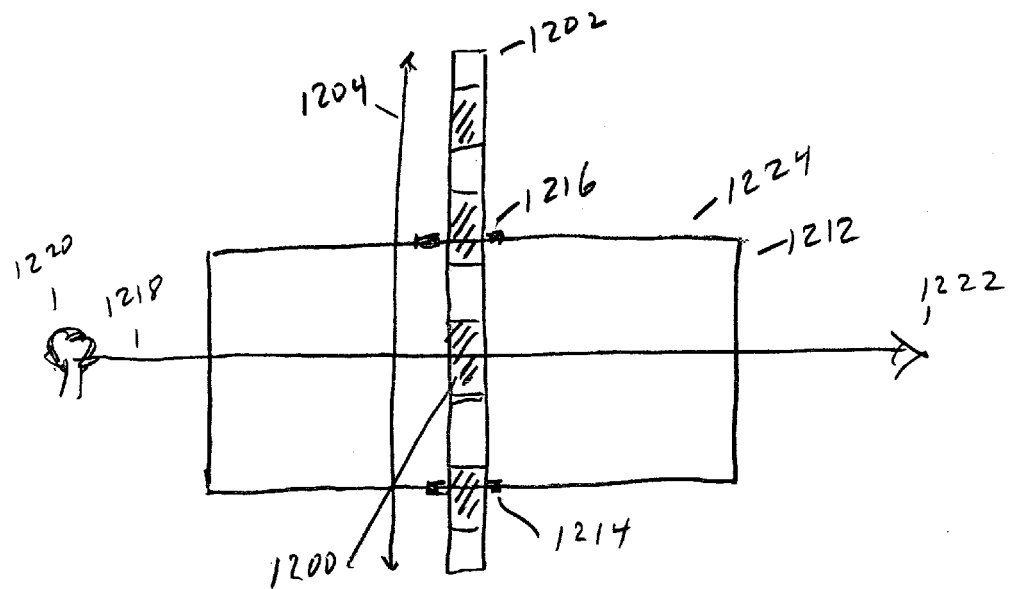
Figure 12F:
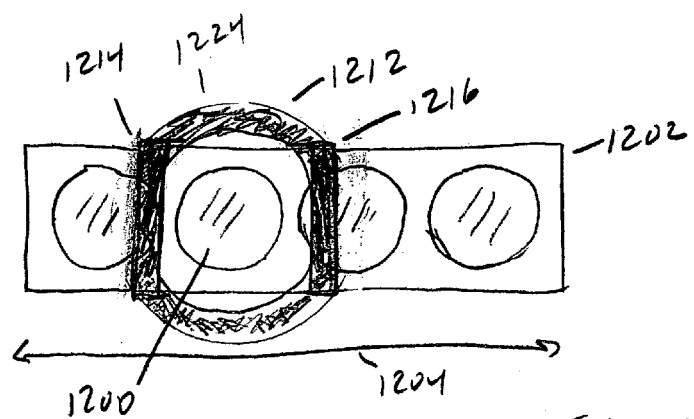

The common optical holder 1202 in FIGS. 12E and 12F will be inserted along its length 1204 into the first slot 1214 of the optical device 1212 across the optical path 1218 to extend out the second slot 1216 of the optical device. The optical holder 1202 has sufficient length to extend along its length 1204 through the first slot 1214, the optical device 1212, the second slot 1216 and extend away from the optical device 1212 on one or both sides of the optical device.

As noted, the first and second slots 1214 and 1216 are opposite and parallel to each other across the eyepiece or barrel 1224 of the optical device. The axis of the first and second slots is the axis of the common optical holder in the optical device. This axis will be perpendicular to the eyepiece or barrel of the optical device and perpendicular to the optical path 1218. The axis can be any angle but typically is either horizontally from side to side (so that the optical holder moves from right and left) or vertically (so that the optical holder moves up and down).

The optical holder 1202 in the first and second slots 1214 and 1216 will position one optical element 1200 of the multiple optical elements in the optical path 1218 within the optical device 1212. The optical holder will move back and forth (up and down or left and right) between the first and second slots in the optical device to position another adjacent optical element of the optical holder in the optical path within the optical device. All of the optical elements, one at a time, in sequence, can be positioned in the optical path within the optical device. The multiple optical elements in the optical device will simulate, one at a time, the optical perspective of multiple creatures to the viewer.

The optical holder can be grasped by the hand of the viewer to move the optical holder in the two slots and move the optical elements one at a time into the optical path of the optical device.

Mechanical means can be utilized to move the optical holder in the optical device to position an optical element in the optical path of light from the outside surrounding environment to the eye of the viewer.

Figure 13:
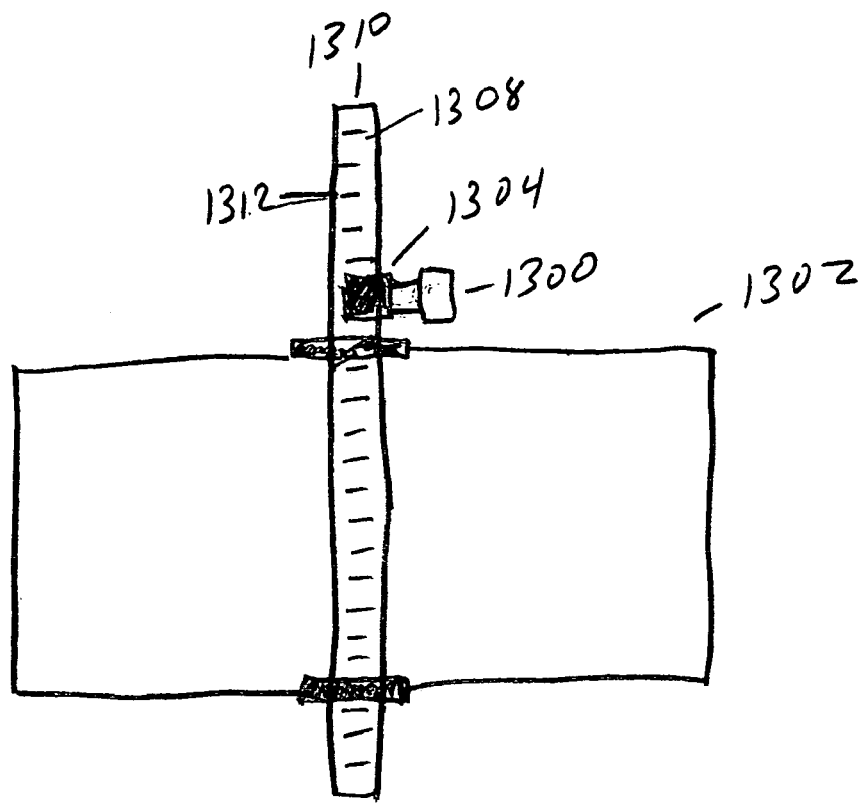
FIG. 13 is a side and front view of a mechanical means for moving the linear optical holder of FIG. 12 in the barrel of the optical device.
Figure 13:
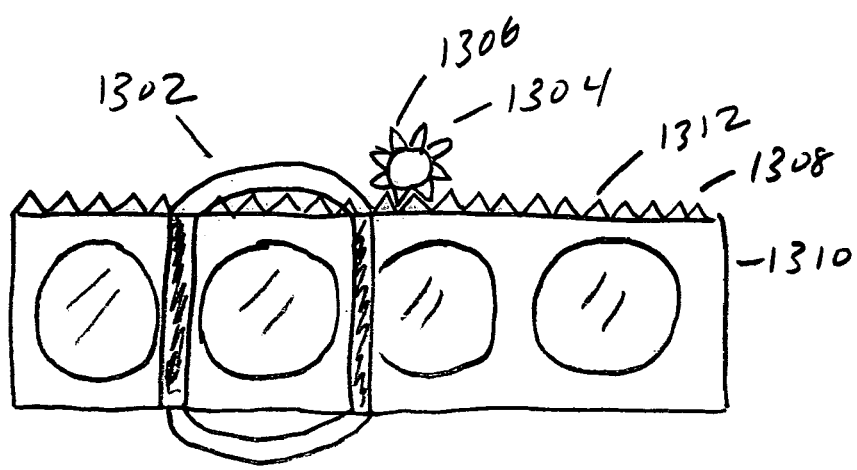

A knob 1300 in FIGS. 13A and 13B external to the optical device 1302 can connect to an gear 1304 with a series of multiple teeth 1306 adjacent to one longitudinal side 1308 of the optical holder 1310 within the optical device.

A series of evenly spaced grooves 1312 of the same size will run along the edge of one longitudinal side 1308 of the optical holder 1310. The evenly spaced teeth 1306 on the gear 1304 will engage at least one groove. The teeth on the gear will be approximately the same size or smaller than the grooves on the optical holder.

The viewer will rotate the external knob 1300 by hand. The external knob 1300 will rotate the attached gear 1304. The gear 1304 will rotate the teeth 1306. The rotating teeth 1306 will engage the grooves 1312 of the optical holder 1310 moving the optical holder between the two slots 1314 and 1316 inside the optical device. The moving optical holder will move one optical element 1318 away from the optical path 1320 and the adjacent optical element 1322 into the optical path.

The optical holder will move forward or backward depending upon the direction of rotation of the knob, through the gear, through the teeth, through the grooves on the side of the optical holder.

The gear can be external to the optical device or internal to the optical device.

Alternately, in this and other embodiments of the present invention, a series of parallel evenly spaced holes of the same size are formed in the optical holder near the edge of one side of the optical holder. The evenly spaced teeth on the gear will engage at least one groove. The teeth on the gear will be approximately the same size or smaller than the holes on the optical holder.

The viewer will rotate the external knob by hand. The external knob will rotate the attached internal gear. The gear will rotate the teeth. The rotating teeth will engage the holes of the optical holder moving the optical holder between the slots inside the optical device. The moving optical holder will move one optical element away from the optical path and the adjacent optical element into the optical path.

The optical holder will move forward or backward depending upon the direction of rotation of the knob, through the gear, through the teeth, through the holes on the side of the optical holder.

Alternately, the teeth of the gear of the control knob can be angled at 45 degrees and engage a second gear with first teeth angled at 45 degrees. Second teeth of the second gear can engage the grooves along the side of the optical holder. This apparatus, known to those of ordinary skill in the art, will allow the control knobs to be positioned on the top or bottom side of the barrel.

Alternately, in this and other embodiments of the present invention, rather than multiple optical elements on a single common optical holder, multiple optical holders, with each optical holder having an optical element, can be arranged in a single parallel series. The series of optical elements in multiple optical holders will function the same as multiple optical elements on a single optical holder.

In the embodiments of a single eyepiece optical device, such as a monocle, or a single barrel optical device, such as a monocular or a telescope, the axis of the first and second slots and thus the axis of motion for the optical holder can be any angle but typically is either horizontally from side to side (so that the optical holder moves from right and left) or vertically (so that the optical holder moves up and down).

In the embodiments of a double eyepiece optical device, such as goggles or a helmet, or a double barrel optical device, such as binoculars, the two eyepieces or two barrels are side by side. For ease of explanation, the subsequent use of the term "barrel" also encompasses "eyepiece".

Each barrel in a double barrel optical device can have its own common optical holder with multiple optical elements. However, the side by side nature of the double barrel optical devices with two optical holders restricts the axis of the first and second slots for each barrel and thus the axis of motion for the optical holder for each barrel to vertically or near vertically (so that each optical holder moves up and down).

Figure 14A:
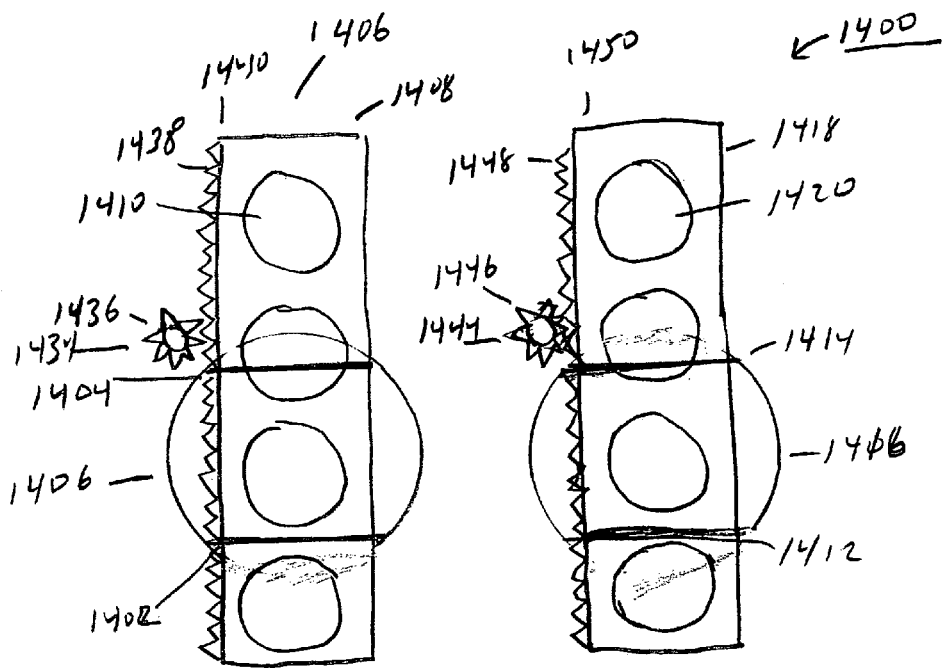
FIG. 14 is front and side view of two linear optical holders removeably mounted in a double barrel optical device.
Figure 14B:
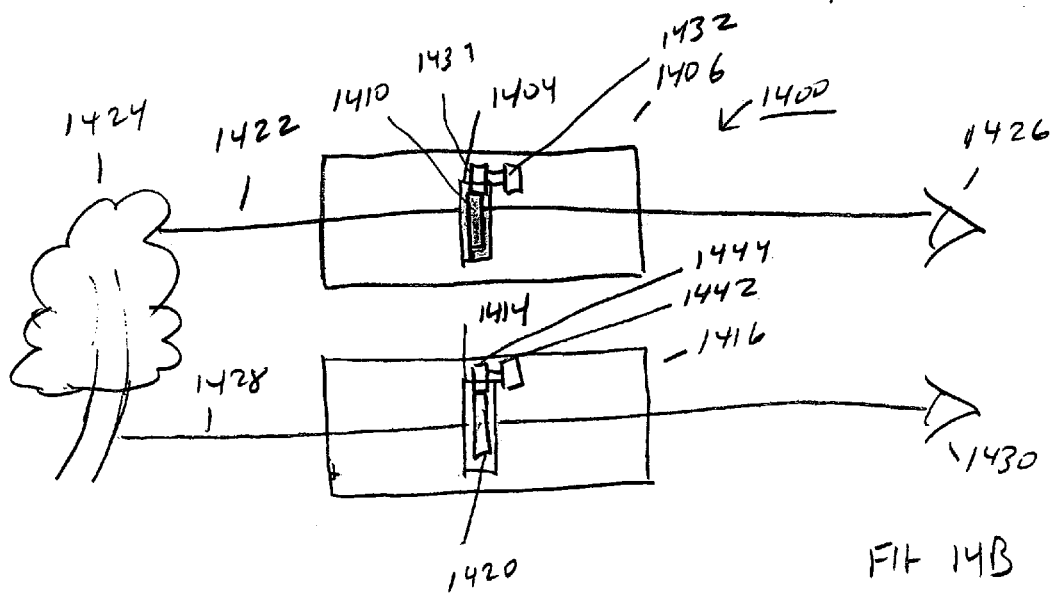

In the embodiments of a double barrel optical device 1400 of FIGS. 14A and 14B, the first and second slots 1402 and 1404 of the first barrel 1406 are on the bottom and top sides of the optical device 1400 with the first common optical holder 1408 having multiple optical elements 1410 moving vertically, relative to the viewer. The first and second slots 1412 and 1414 of the second barrel 1416 are on the bottom and top sides of the optical device 1400 with the second common optical holder 1418 having multiple optical elements 1420 moving vertically, relative to the viewer. The first and second common optical holders 1408 and 1418 are parallel.

The optical path 1422 of the light in the first barrel 1406 is from the outside surroundings 1424 through the optical element 1410 in the first holder 1408 to the first eye 1426 of the viewer. The optical element will transform the light to simulate the optical perspective of a creature.

The optical path 1428 of the light in the second barrel 1416 is from the outside surroundings 1424 through the optical element 1420 in the second holder 1418 to the second eye 1430 of the viewer. The optical element will transform the light to simulate the optical perspective of a creature.

If the optical element on the first optical holder is identical to the optical element on the second optical holder, both eyes of the viewer will be seeing the outside surroundings through identical optical elements simultaneously, one optical element for each eye of the viewer.

The first and second optical holders can each be moved by hand by the viewer independently of the other optical holder. Each optical holder can be grasped by the hand of the viewer to move that optical holder in the two slots of the corresponding barrel and move the optical elements of that optical holder one at a time into the optical path in that barrel of the optical device.

Alternately, as previously discussed, a first external knob 1432 connects to a first internal gear 1434 with a first series of multiple teeth 1436. The teeth 1436 engage a series of evenly spaced grooves 1438 along one longitudinal side 1440 of the first common optical holder 1408. The first external knob 1432 can be positioned on the right or left side of the first barrel 1406 of the optical device 1400 adjacent to the optical holder 1408 in the slots 1402 and 1404 in the first barrel. The viewer will rotate the first external knob by hand moving the first optical holder in the slots in the first barrel and move the optical elements back and forth, one at a time, into the first optical path of the optical device.

A second external knob 1442 connects to a second internal gear 1444 with a second series of multiple teeth 1446. The teeth 1446 engage a series of evenly spaced grooves 1448 along one longitudinal side 1450 of the second common optical holder 1418. The second external knob 1442 can be positioned on the right or left side of the second barrel 1416 of the optical device 1400 adjacent to the optical holder 1418 in the slots 1412 and 1414 in the second barrel. The viewer will rotate the second external knob by hand moving the second optical holder in the slots in the second barrel and move the optical elements back and forth, one at a time, into the second optical path of the optical device.

The first and second optical holders will be moved by the viewer, through the knob and gear, independently of the other optical holder.

The first and second external knobs can be on the right or left side of their respective barrel or using the two angled gears previously discussed be on the top or bottom side of the optical device.

If the optical element on the first optical holder is identical to the optical element on the second optical holder, and the optical holders are moved dependently, both eyes of the viewer will be seeing the outside surroundings through identical optical elements simultaneously, one optical element for each eye of the viewer.

In another embodiment, the optical device has a single common external knob. The first and second optical holders will move simultaneously and dependently of the other optical holder.

Figure 14C:
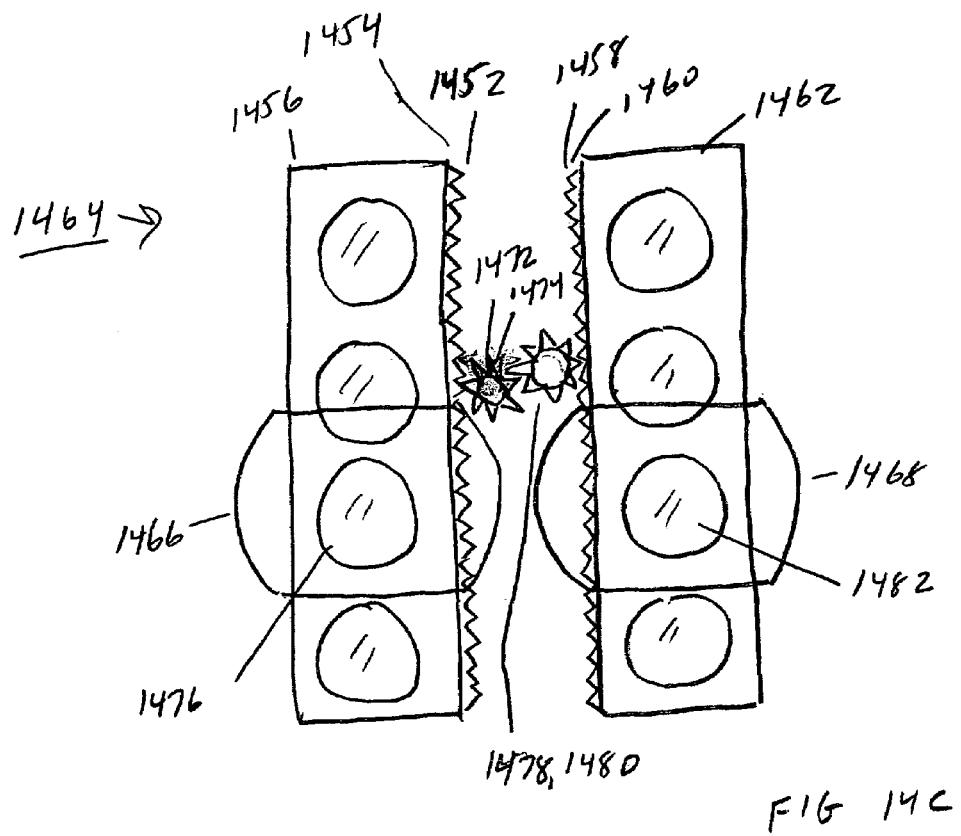
Figure 14D:
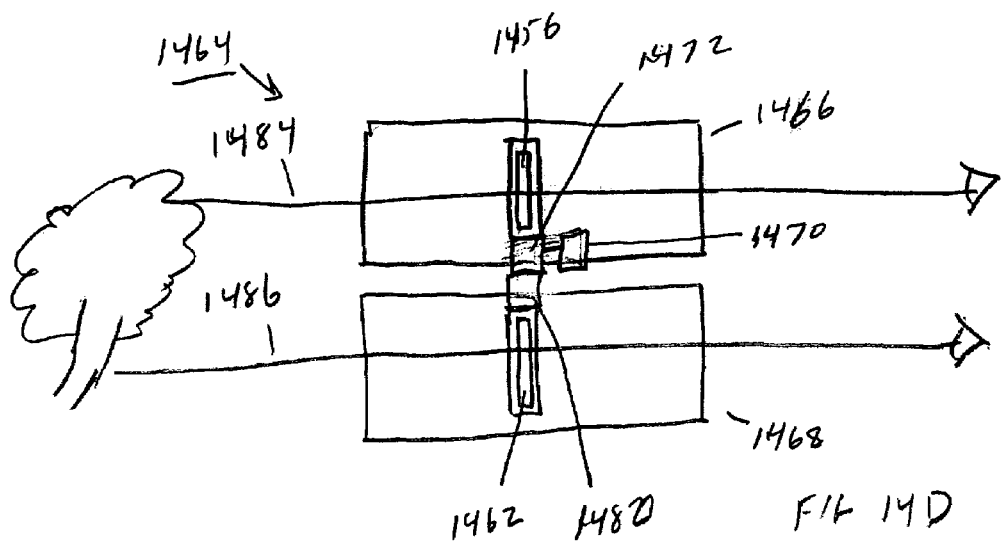

The grooves 1452 in FIGS. 14C and 14D along the edge 1454 of the first optical holder 1456 will be right side while the grooves 1458 along the edge 1460 of the second optical holder 1462 will be along the left side. The grooved edges 1454 and 1460 of the two optical holders 1456 and 1462 will be adjacent and on the inside of the optical device 1464 near the intersection of the first and second barrel 1466 and 1468.

The common external knob 1470 will be positioned on the optical device 1464 between the first and second optical holders 1456 and 1462. The common external knob 1470 will have a first internal gear 1472 with teeth 1474 to directly engage the grooves 1452 of the first optical holder 1456 to move the optical holder in the slots to position each optical element 1476 in the optical path in the first barrel 1466. The teeth 1474 of the first internal gear 1472 will also engage the teeth 1478 of a second internal gear 1480. The teeth 1478 of the second internal gear 1480 will directly engage the grooves 1458 of the second optical holder 1460 to move the optical holder in the slots to position each optical element 1482 in the optical path in the second barrel 1468.

The common knob 1470 will move the first and second optical holders 1456 and 1462 in the same direction up and down simultaneously. The first optical holder will position one optical element in the optical path 1484 in the first barrel of the optical device while the second optical holder will position one optical element in the optical path 1486 in the second barrel of the optical device. The viewer will rotate the common external knob by hand, moving the first optical holder in the slots in the first barrel and moving the second optical holder in the slots in the second barrel, thus moving the optical elements back and forth, two at a time, into the optical path within each barrel of the optical device. All of the optical elements on the two optical holders, one pair at a time, in sequence, can be positioned in the optical paths in the two barrels within the optical device.

The first internal gear and the second internal gear should be the same size with the same number and size of teeth for equal and parallel movement of the two optical holders.

Figure 14E:
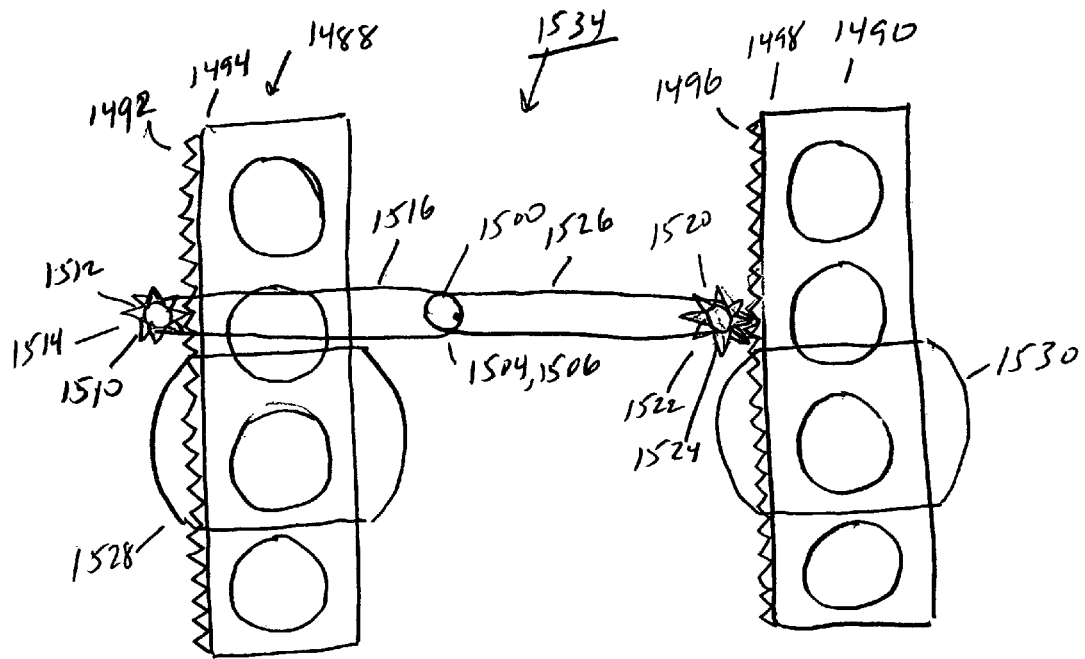
Figure 14F:
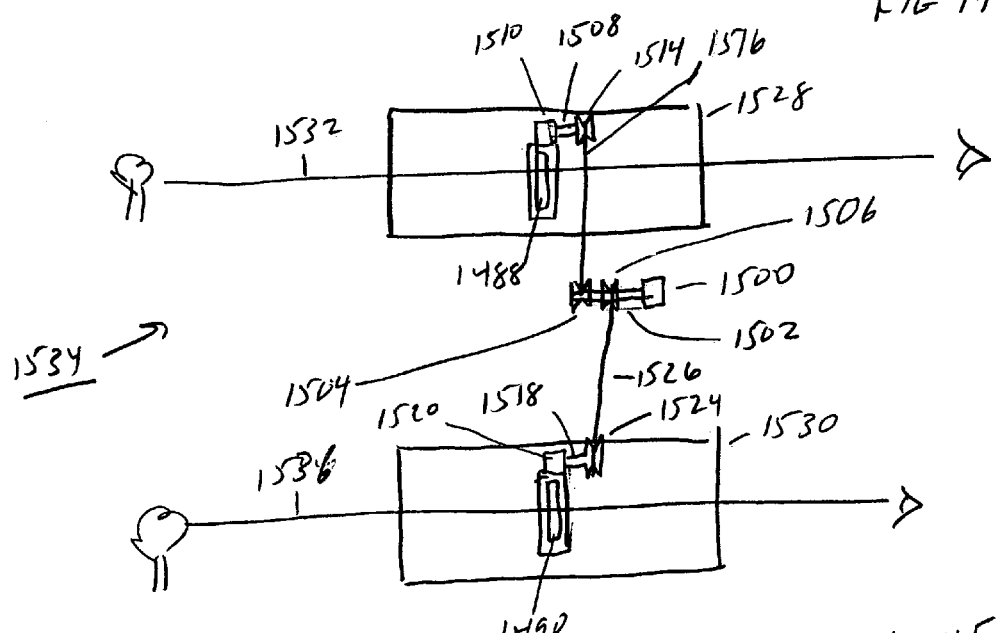

As shown in the FIGS. 14E and 14F, the first and second optical holders 1488 and 1490 can move simultaneously and dependently of the other optical holder. The grooves 1492 along the edge 1494 of the first optical holder 1488 will be left side while the grooves 1496 along the edge 1498 of the second optical holder 1490 will be along the left side.

A common external knob 1500 will be positioned on the optical device 1502 between the first and second optical holders 1488 and 1490. The common external knob 1500 has a shaft 1502 with a first grooved wheel 1504 and a second grooved wheel 1506 around the shaft.

A first internal axle 1508 with a first gear 1510 with teeth 1512 to engage the grooves 1492 of the first holder 1488 is positioned adjacent to the first holder. The first internal axle 1508 has a third grooved wheel 1514. A first cord 1516 (or wire) is tightly looped in a closed loop around the third grooved wheel 1514 of the first internal axle 1508 and the first grooved wheel 1504 of the common knob 1500 to form a first fixed pulley.

A second internal axle 1518 with a second gear 1520 with teeth 1522 to engage the grooves 1496 of the second holder 1498 is positioned adjacent to the second holder. The second internal axle 1518 has a fourth grooved wheel 1524. A second cord 1526 (or wire) is tightly looped in a closed loop around the fourth grooved wheel 1522 of the second internal axle 1518 and the second grooved wheel 1506 of the common knob 1500 to form a second fixed pulley.

The viewer will turn the common knob 1500. The turning common knob 1500 will rotate its shaft 1502 and the first grooved wheel 1504 of the first fixed pulley. The rotating first grooved wheel 1504 will move the first cord 1516. The moving first cord 1506 in the closed loop will rotate the third grooved wheel 1514. The rotating third groove wheel 1514 will rotate the first internal axle 1508. The rotating first internal axle 1508 will rotate the first gear 1510. The teeth 1512 on the rotating first gear 1510 will engage the grooves 1492 of the first optical holder 1488, moving the first optical holder 1488 in the first barrel 1528.

Simultaneously, the turning common knob 1500 will rotate its shaft 1502 and the second grooved wheel 1506 of the second fixed pulley. The rotating second grooved wheel 1506 will move the second cord 1526. The moving second cord 1526 in the closed loop will rotate the fourth grooved wheel 1524. The rotating fourth groove wheel 1524 will rotate the second internal axle 1518. The rotating second internal axle 1518 will rotate the second gear 1520. The teeth 1522 on the rotating second gear 1520 will engage the grooves 1496 of the second optical holder 1490, moving the second optical holder 1490 in the second barrel 1530.

The common knob 1500 will move the first and second optical holders 1488 and 1490 in the same direction up and down simultaneously. The first optical holder 1488 will position a first optical element in the optical path 1532 in the first barrel 1528 of the optical device 1534 while the second optical holder 1490 will position a second optical element in the optical path 1536 in the second barrel 1530 of the optical device. The first and second optical holders moving up and down together will each position another adjacent optical element in each optical holder in the optical path within the barrel of the optical device. All of the optical elements on the optical holder, one at a time, in sequence, can be positioned in the optical path within the optical device.

If the optical elements on the first optical holder are identical to the optical elements on the second optical holder, both eyes of the viewer will be seeing the outside surroundings through identical optical elements simultaneously, one optical element for each eye of the viewer.

The first gear and the second gear should be the same size with the same number and size of teeth and the first and second cords should be the same length for equal and parallel movement of the two optical holders.

The first and second pulleys also work when the grooved edges of the first and second optical holders are both on the right side. When the grooved edges of the first and second optical holders are on opposite sides, then one of the two pulley cords will have to be twisted 180 degrees to form a figure-8 between the two grooved wheels, to ensure the optical holders move in the same direction.

Figure 14G:
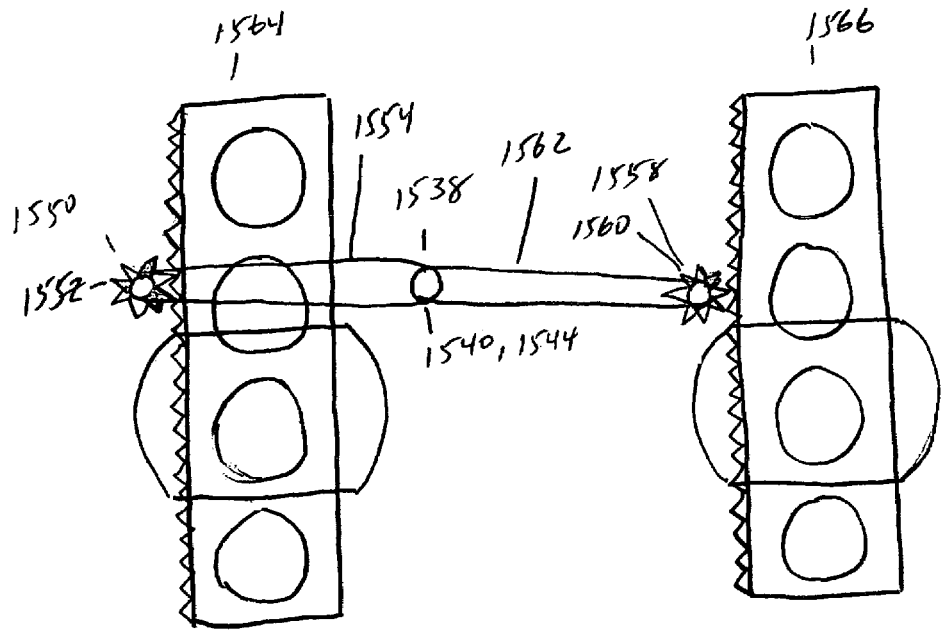
Figure 14H:
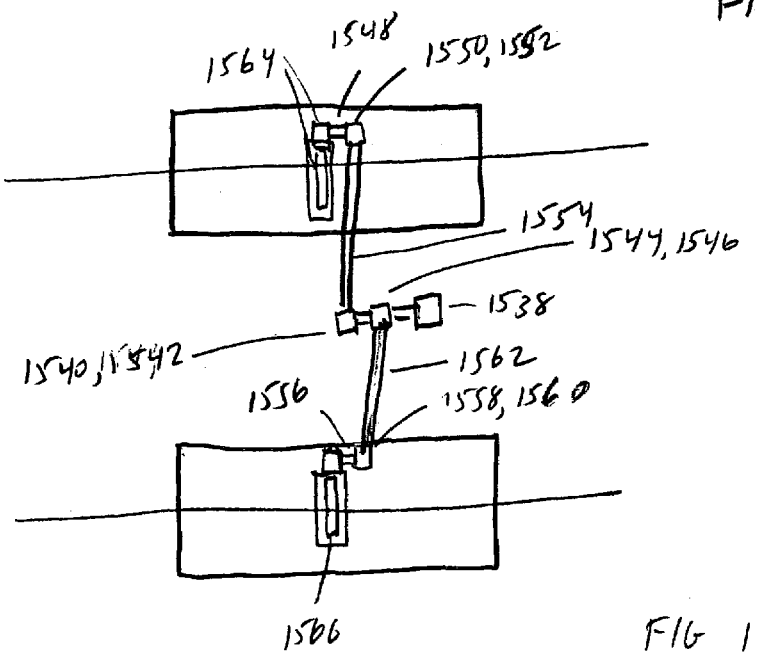

As shown in FIGS. 14G and 14H, teethed gears and a chain in a chain drive can substitute for the grooved wheels and cord in the pulley drive of FIGS. 14E and 14F in this and other embodiments of the present invention.

The external control knob 1538 will have a third gear 1540 with teeth 1542 and a fourth gear 1544 with teeth 1546. The first axle 1548 will have a fifth gear 1550 with teeth 1552. A first chain 1554 in a closed loop will connect the external control knob 1538 to the first axle 1548. The teeth 1542 of the third gear 1540 of the control knob 1538 will engage the holes in the links of the first chain 1554 while the teeth 1552 of the fifth gear 1550 of the first axle 1548 will also engage the holes in the links of the first chain 1554.

The second axle 1556 will have a sixth gear 1558 with teeth 1560. A second chain 1562 in a closed loop will connect the external control knob 1538 to the second axle 1556. The teeth 1546 of the fourth gear 1544 of the control knob 1538 will engage the holes in the links of the second chain 1562 while the teeth 1560 of the sixth gear 1558 of the second axle 1556 will engage the holes in the links of the second chain 1562. The control knob 1538 turning will rotate the first and second axles 1548 and 1556 simultaneously which will move the first and second optical holders 1564 and 1566 simultaneously in the same direction.

The gears should be the same size with the same number and size of teeth and the first and second chains should be the same length for equal and parallel movement of the two optical holders.

Again, the two sets of gears and chain also work when the grooved edges of the first and second optical holders are both on the left side. When the grooved edges of the first and second optical holders are on opposite sides, then one of the two chains will have to be twisted 180 degrees to form a figure-8 between the two gears, to ensure the optical holders move in the same direction.

Figure 14I:
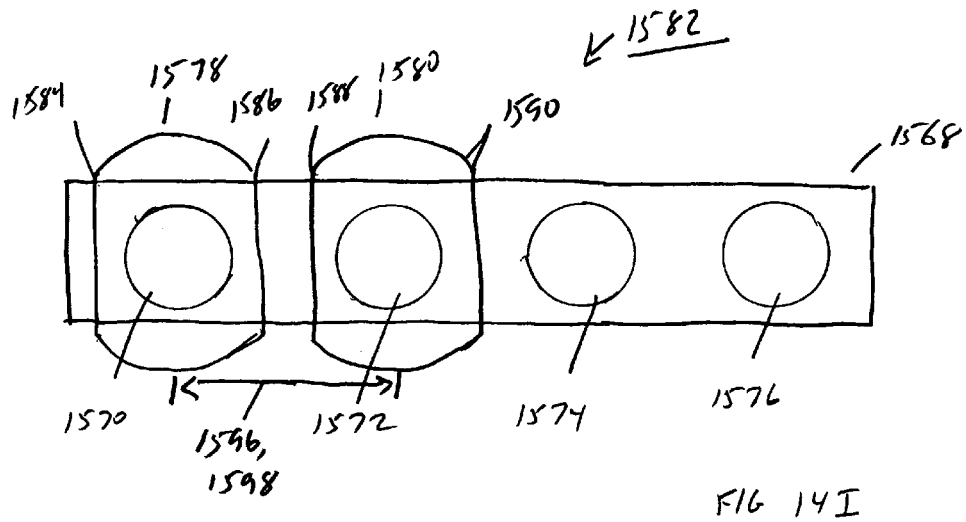
Figure 14J:
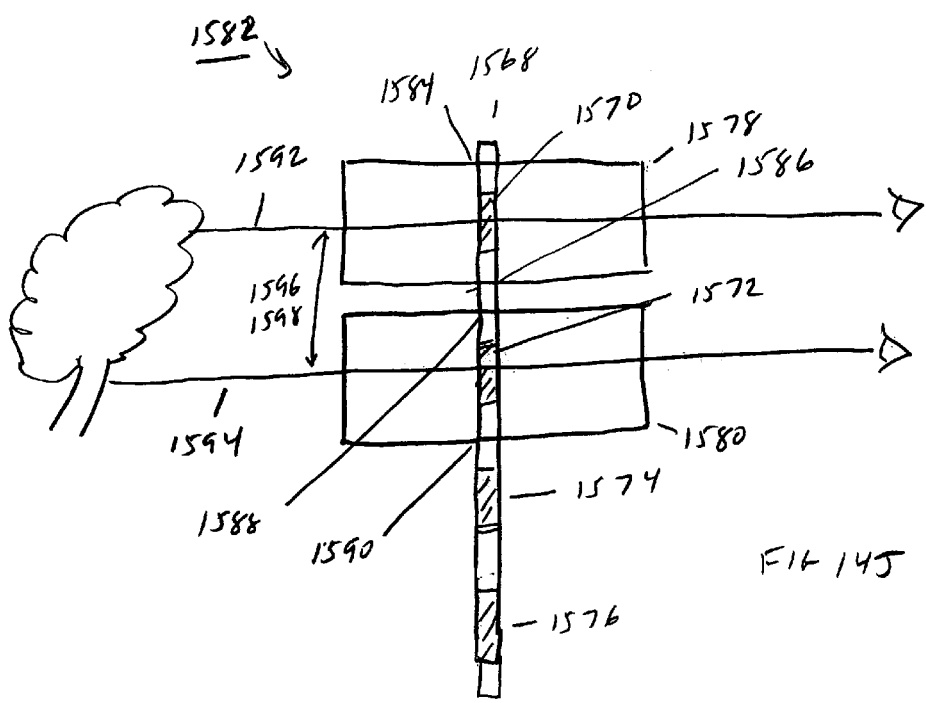

A single optical holder 1568 of FIGS. 14I and 14J with multiple optical elements 1570, 1572, 1574 and 1576 can be removeably mounted in the double eyepieces or the double barrels 1578 and 1580 inside the optical device 1582.

The first barrel 1578 has a first slot 1584 and a second slot 1586. The second barrel 1580 has a first slot 1588 and a second slot 1590.

The first slot 1584 of the first barrel is on the left side of the first barrel and the second slot 1586 of the first barrel is on the right side of the barrel. The first slot 1588 of the second barrel is on the left side of the second barrel and the second slot 1590 of the second barrel is on the right side of the barrel.

The right side of the first barrel 1578 is adjacent to the left side of the second barrel 1580. The second slot 1586 of the first barrel 1758 is adjacent to the first slot 1588 of the second barrel 1580. The first and second slots 1584 and 1586 of the first barrel 1578 are aligned with the first and second slots 1588 and 1590 of the second barrel 1580.

A single optical holder 1568 with multiple optical elements 1570, 1572, 1574 and 1576 is inserted into the first slot 1584 of the first barrel 1578 across the optical path 1592 of the first barrel 1578 through the second slot 1586 of the first barrel 1578, through the first slot 1588 of the second barrel 1580 across the optical path 1594 of the second barrel 1580 and extends out the second slot 1590 of the second barrel 1580 of the optical device 1582. The single optical holder 1568 has sufficient length to extend along its length through the first and second barrels 1578 and 1580 and extend away from the optical device 1582 on one or both sides of the optical device. The single optical holder will move horizontally, relative to the viewer.

The optical elements on the optical holder 1568 can be paired, with a first optical element 1570 being identical to a second optical element 1572. In this illustrative example, the first and second optical elements are adjacent. The optical elements on the optical holder will consist of a first set of paired adjacent optical elements 1570 and 1572 and a second set of paired adjacent optical elements 1574 and 1576. The optical holder can have multiple sets of paired adjacent optical elements.

Alternately, the optical elements (for example, ABCD-ABCD) in the optical holder can have a series of optical elements (ABCD) in sequence followed by a second series (ABCD) of the same optical elements in the same sequence. There may be intervening optical elements between the first and second optical elements (AA, BB, CC, and DD) but those intervening optical elements will be paired with other optical elements on the opposite side of the first optical element or with other optical elements on the opposite side of the second optical element.

The first and second optical elements 1570 and 1572 are separated on the optical holder 1568 by a distance 1596 equal to the distance 1598 between the optical path 1592 in the first barrel 1578 and the optical path 1594 in the second barrel 1580 of the optical device 1582.

The optical holder 1568 in the first and second slots 1584 and 1586 of the first barrel 1578 will position the first optical element 1570 of the optical holder in the optical path 1592 within the first barrel 1578 of the optical device 1582 and in the first and second slots 1588 and 1590 of the second barrel 1580 position the second optical element 1572 of the optical holder in the optical path 1594 within the second barrel 1580 of the optical device at the same time. Since the first and second optical elements are identical, both eyes of the viewer will be seeing the outside surroundings through identical optical elements simultaneously, one optical element for each eye of the viewer.

The moving optical holder 1568 will move the first optical element 1570 away from the optical path 1592 in the first barrel and move the second identical optical element 1572 away from the optical path 1594 in the second barrel and move the adjacent third optical element 1574 into the optical path 1592 in the first barrel and move the adjacent identical fourth optical element 1576 into the optical path 1594 in the second barrel. The third optical element 1574 is identical to the fourth optical element 1576.

All of the optical elements, one pair at a time, in sequence, can be positioned in the optical paths in the two barrels within the optical device.

The single common optical holder can be grasped by the hand of the viewer to move the optical holder in the slots in the two barrels and move the optical elements two at a time into the optical paths of the optical device.

As discussed previously, an external knob can connect to an internal gear with a series of multiple teeth. The teeth engage a series of evenly spaced grooves along one longitudinal side of the common optical holder. The external knob can be positioned on the top or bottom side of the optical device adjacent to the optical holder in the slots in the two barrels.

The viewer will rotate the external knob by hand moving the single common optical holder in the slots in the two barrels and move the optical elements back and forth, two at a time, into the optical paths of the optical device.

In this and other embodiments of the present invention, an optical device embodiment with a first and second eyepiece would function the same as this disclosed optical device embodiment of a first and second barrel. The double barrel optical device is merely used as an illustrative example.

Circular Optical Holder with Multiple Optical Elements

Figure 15A:
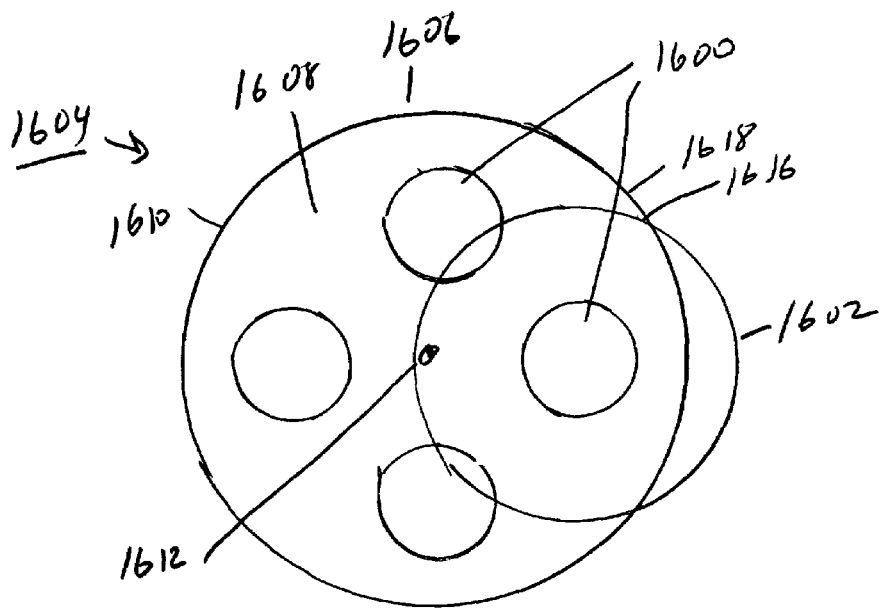
FIG. 15 is a front and side view of a circular optical holder of multiple optical elements removeably or permanently mounted in a barrel of an optical device.
Figure 15B:
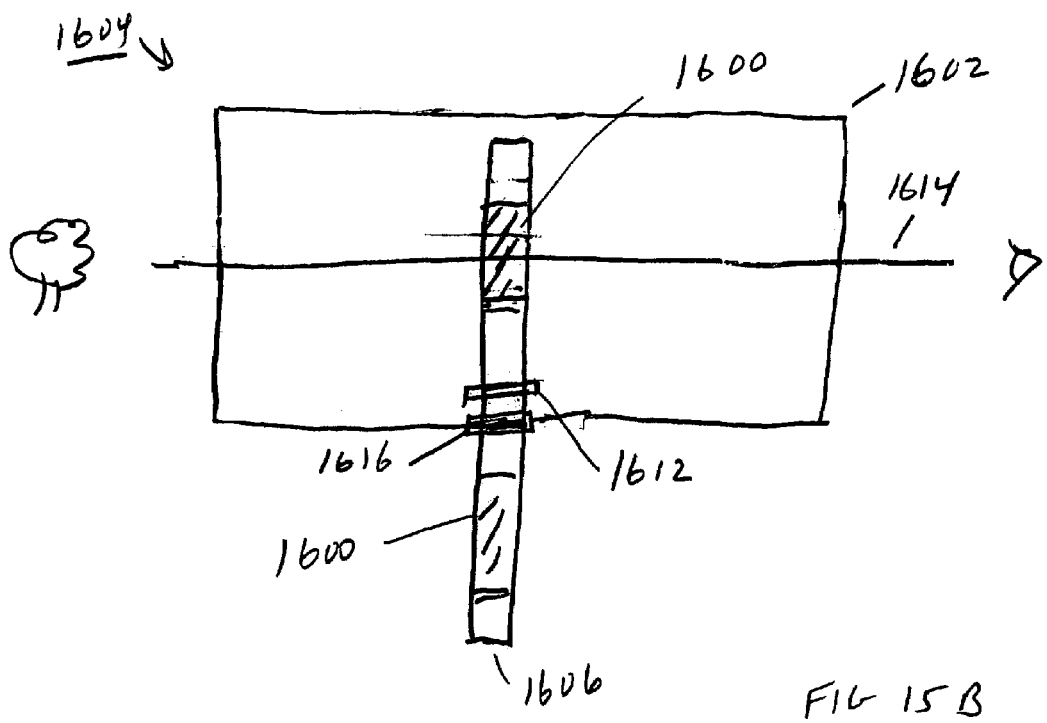

A circular array of multiple optical elements 1600 in FIGS. 15A and 15B can be mounted in the eyepiece or in the barrel 1602 inside the optical device 1604. The multiple optical elements in the optical device of the present invention will simulate, one at a time, the optical perspective of multiple creatures to the viewer.

Multiple optical elements 1600 are positioned in a single circular series along the circumferential length of a single common circular optical holder 1606. The optical holder 1606 can have a frame securely holding the optical elements or can have the optical elements surrounded and securely held by supporting material 1608, which is securely held within the circular frame 1610 of the optical holder. The frame will be a rigid material such as a polymer, plastic or metal. The supporting material will also be a rigid material such as a polymer, plastic or metal. The supporting material need not be the same rigid material as the frame. The optical holder will generally have a short depth and be generally rectangular in cross-section along the width and depth.

Alternately, multiple optical holders, each holding a single optical element, are positioned in a circular series along the circumferential length of a single circular frame. The multiple optical holders in a single circular frame would function in the present invention the same as the multiple optical elements in a single common circular optical holder.

Returning to the multiple optical elements 1600 in a single common circular optical holder 1606, the circular optical holder will be removeably or permanently mounted on a spindle 1612 in the single barrel optical device 1604. The single barrel optical device is an illustrative example. A single eyepiece optical device will function the same with this and subsequent embodiments.

The circular optical holder 1606 will be perpendicular to the optical path 1614 in the single barrel. The multiple optical elements 1600 on the optical holder will also be perpendicular to the optical path 1614.

The circular optical holder 1606 will position one optical element 1600 of the multiple optical elements in the optical path 1614 within the optical device 1604. The circular optical holder 1606 will rotate on the spindle 1612 in the optical device to position another adjacent optical element 1600 of the optical holder in the optical path 1614 within the optical device 1604. All of the optical elements, one at a time, in sequence, can be positioned in the optical path within the optical device. The multiple optical elements in the optical device will simulate, one at a time, the optical perspective of multiple creatures to the viewer.

An external slot 1616, typically rectangular, can be provided adjacent to the optical holder 1606 in the optical device 1604. An edge 1618 of the internal circular optical holder 1606 can extend externally through the slot 1616. The optical holder can be grasped by the hand of the viewer to rotate the optical holder in the optical device and rotate the optical elements one at a time into the optical path of the optical device.

Mechanical means can be utilized to move the optical holder in the optical device to position an optical element in the optical path.

As discussed previously, an external knob connects to an internal gear with a series of multiple teeth. The teeth engage a series of evenly spaced grooves along the circumferential side of the internal circular optical holder. The external knob can be positioned on the top or bottom, right or left side of the optical device adjacent to the circular optical holder in the barrel of the optical device.

The viewer will rotate the external knob by hand, rotating the optical holder in the barrel and rotating the optical elements, one at a time, into the optical path of the optical device.

The circular optical holder embodiment also can be utilized in a single eyepiece optical device. Two circular optical holder embodiments can be used independently in a double eyepiece or double barrel optical device with one circular optical holder configuration embodiment for each eyepiece or each barrel. As discussed previously, two circular optical holder embodiments can have a common control knob and either a pulley drive system or a chain drive system so that the two circular optical holder embodiments can be used simultaneously and dependently.

A single circular optical holder embodiment also can be utilized in a double eyepiece or double barrel optical device.

The spindle and circular optical holder are positioned between the two barrels or two eyepieces of the optical device. The multiple optical holders on one side of the circular optical holder will extend into the first barrel while the multiple optical holders on the opposite side of the circular optical holder will extend into the second barrel.

Multiple optical elements are positioned in a single circular series along the circumferential length of the single common circular optical holder. The circular optical holder will be removeably or permanently mounted on a spindle between the double barrels of the optical device.

The circular optical holder will be perpendicular to the first optical path in the first barrel and perpendicular to the second optical path in the second barrel. The multiple optical elements on the optical holder will also be perpendicular to the first and second optical paths.

The optical elements are each paired with an optical element on the opposite side of the circular optical holder. The optical elements on the circular optical holder will consist of a first series of optical elements in sequence followed by a second series of the same optical elements in the same sequence. There may be intervening optical elements between the first and second optical elements but those intervening optical elements will be paired with other optical elements on the opposite side of the first optical element or with other optical elements on the opposite side of the second optical element.

The first and second optical elements are separated on the circular optical holder by a distance equal to the distance between the optical path in the first barrel and the optical path in the second barrel of the optical device.

The circular optical holder will position the first optical element of the optical holder in the optical path within the first barrel of the optical device and position the second optical element of the optical holder in the optical path within the second barrel of the optical device at the same time. Since the first and second optical elements are identical, both eyes of the viewer will be seeing the outside surroundings through identical optical elements simultaneously, one optical element for each eye of the viewer.

The rotating circular optical holder will rotate the first optical element away from the optical path in the first optical holder and rotate the second identical optical element away from the optical path in the second optical holder and rotate the adjacent third optical element into the optical path in the first optical holder and rotate the adjacent fourth identical optical element into the optical path in the second optical holder. The third optical element is identical to the fourth optical element.

All of the optical elements, one pair at a time, in sequence, can be positioned in the optical paths in the two barrels within the optical device.

As discussed previously, an external knob connects to an internal gear with a series of multiple teeth. The teeth engage a series of evenly spaced grooves (or evenly spaced holes) along the circumferential side of the internal common circular optical holder. The external knob can be positioned on the top or bottom, right or left side of the optical device adjacent to the circular optical holder in the barrel of the optical device.

An external knob is attached to one end of the single common axle to rotate the optical holder and the optical elements.

The axle will rotate so that the first optical element in the circular optical holder is in the first optical path in the first barrel of the optical device. The other optical elements and the other optical holders are not in the first optical path of the first barrel. Simultaneously, the axis will rotate so that the second optical element in the circular optical holder, opposite the first optical element, is in the second optical path in the second barrel of the optical device. The other optical elements and the other optical holders are not in the second optical path of the second barrel.

Since the first and second optical elements are identical, both eyes of the viewer will be seeing the outside surroundings through identical optical elements simultaneously, one optical element for each eye of the viewer.

The rotating knob rotates the axle so the first optical element rotates out of the first optical path while the adjacent third optical element rotates into the first optical path. Simultaneously, the rotating knob rotates the axle so the second optical element rotates out of the second optical path while the adjacent fourth optical element rotates into the second optical path. The third optical element will be identical and opposite to the fourth optical element.

The rotating knob and the resulting rotation of the axle will move all of the first series of multiple optical elements into the first optical path of the optical device simultaneously with moving all of the second series of multiple optical elements into the second optical path of the optical device, one pair at a time, and in sequence.

As previously discussed, a slot, typically rectangular, can be provided in the optical device. An edge of the circular optical holder can extend externally through the slot. The optical holder can be grasped by the hand of the viewer to rotate the optical holder in the optical device and rotate the optical elements two at a time into the optical paths of the optical device.

In this and other embodiments of the present invention, an optical device embodiment with a first and second eyepiece would function the same as this disclosed optical device embodiment of a first and second barrel. The double barrel optical device is merely used as an illustrative example.

Multiple Optical Holders on a Common Axle

Multiple optical elements can be arranged in a revolving door configuration around a common axle in an optical device so that one of the multiple optical elements is sequentially moved into position in the eyepiece or inside the optical device. The optical device can, in series, move multiple optical elements into position. The optical device can be used for multiple optical elements to simulate the optical perspective of multiple creatures.

Figure 16A:
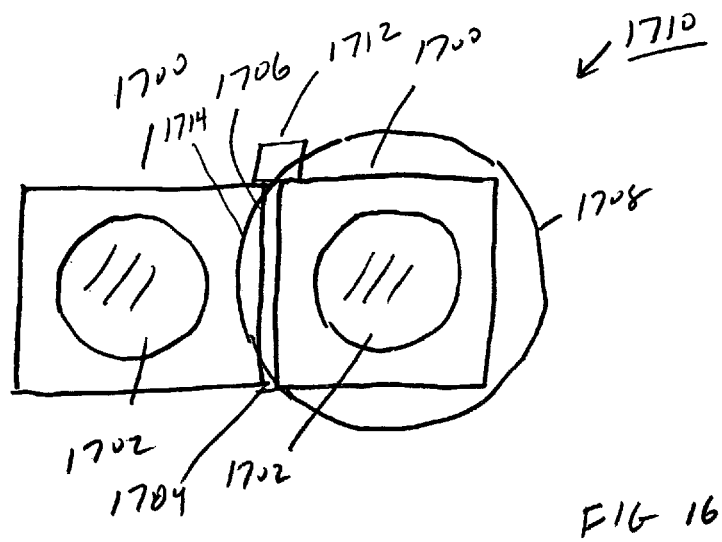
FIG. 16 is a front and side view of multiple optical holders of multiple optical elements on a common axle mounted in a barrel of an optical device.
Figure 16B:
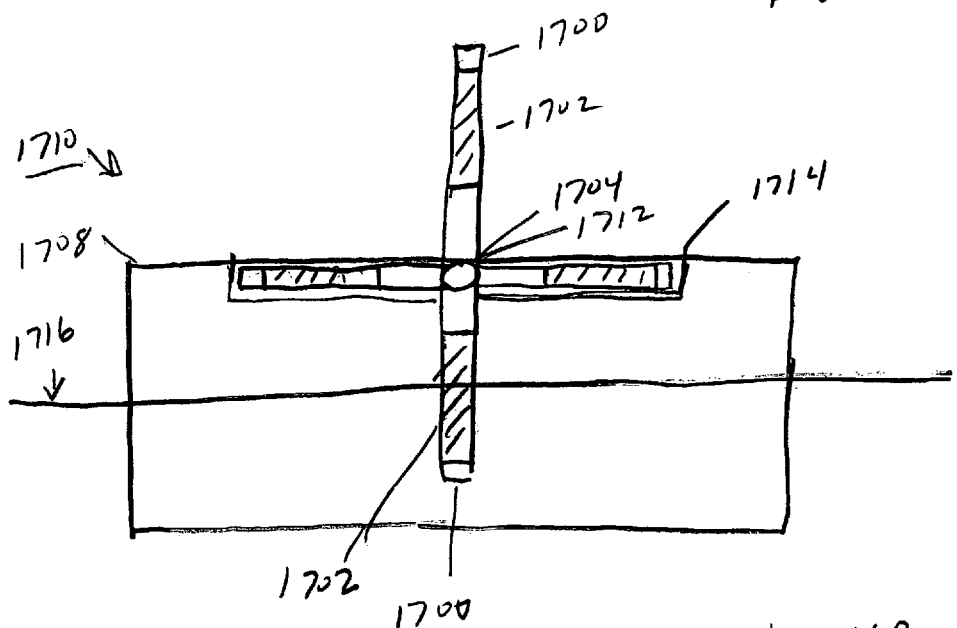

Multiple optical holders 1700 in FIGS. 16A and 16B, each optical holder 1700 securely holding a single optical element 1702, are arranged circumferentially around a common axle 1704. One side 1706 of each optical holder 1700 will extend along the longitudinal length of the common axle 1704 and will be permanently mounted or pivotably mounted to the axle.

Preferably but not necessarily, the optical holders 1700 are arranged equiangularly around the axle 1704. Two optical holders are 180 degrees apart, three optical holders are 120 degrees apart, four optical holders are 90 degrees apart, et cetera.

The axle 1704 and multiple optical holders 1700 are secured within the eyepiece or barrel 1708 of the optical device 1710.

The axle 1704 can freely rotate within the barrel 1708. Although not shown in this figure for ease of understanding, each end of the axle can be within an indentation or held by a collar or bracket to allow free rotation, as is known in the art.

An external knob 1712 is attached to one end of the axle 1704 to rotate the axle 1704 and the optical holders 1700. The optical holders will rotate internally or externally through a rectangular slot 1714 in the barrel 1708.

The axle 1704 will rotate so that a first optical element 1702 in a single optical holder 1700 is in the optical path 1716 in the barrel 1708 of the optical device 1710. The other optical elements and the other optical holders are not in the optical path.

The rotating knob rotates the axle so the first optical element and optical holder rotate out of the optical path while the second optical element and optical holder rotate into the optical path of the optical device. The rotating knob and the resulting rotation of the axle will move all of the multiple optical elements and optical holders into the optical path of the optical device one at a time and in sequence.

Alternately, the rotation need not be one direction so the optical element and optical holders can be rotated into the optical path forwards and backwards.

If the optical holders are pivotably mounted on the axis, then restraining means, such as a flexible lip or a flexible brush, can be provided in the optical device to restrain or hold the optical holders not in the optical path from pivoting into the optical path. The restraining means would be flexible enough and positioned in the optical path such that rotating the axle moves the optical holder in the optical path out of the optical path and moves a single optical holder into the optical path with the other optical holders being restrained out of the optical path.

This revolving door configuration embodiment also can be utilized in a single eyepiece optical device. Two revolving door configuration embodiments can be used independently in a double eyepiece or double barrel optical device with one revolving door configuration embodiment for each eyepiece or each barrel. As discussed previously, two revolving door configuration embodiments can have a common control knob and either a pulley system or a gear and chain system so that the two revolving door configuration embodiments can be used simultaneously and dependently.

Figure 16C:
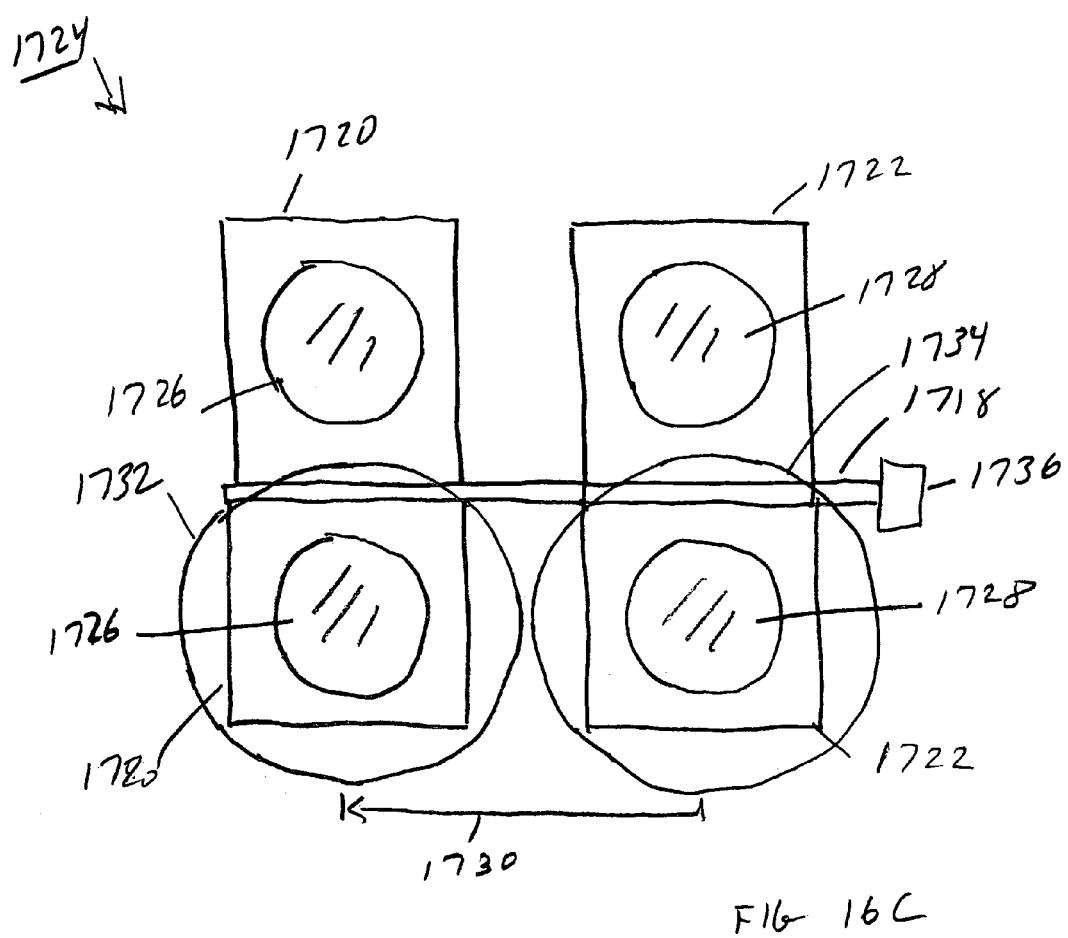

A single common axle 1718 in FIG. 16C can have a first set of multiple optical holders 1720 and a second set of multiple optical holders 1722 in a revolving door configuration for a double barrel or double eyepiece optical device 1724. One of the multiple optical elements from the first set and one of the multiple optical holders from the second set are sequentially moved into position in the two eyepieces or two barrels inside the optical device. The optical device can, in series, move multiple optical elements from each set into position.

A first set of multiple optical holders 1720, each optical holder 1720 securely holding a single optical element 1726, are arranged circumferentially around a single common axle 1718. A second set of multiple optical holders 1722, each optical holder 1722 securely holding a single optical element 1728, are also arranged circumferentially around the common axle 1718 at a different position on the axle from the first set. The first set 1720 is spaced a distance 1730 from the second set 1722. One side of each optical holder will extend along the longitudinal length of the common axle and will be permanently mounted or pivotably mounted to the axle.

The common axle 1718 extends across the top side of the two barrels 1732 and 1734 or extends across the bottom side of the two barrels with the first set of multiple optical holders 1720 extending into the first barrel 1732 and the second set of optical holders 1722 extending into the second barrel 1734.

The multiple optical elements 1720 in the first set are each paired with the multiple optical elements in the second set 1722. Each one of the optical elements in the first set will be identical to one of the optical elements in the second set.

An external knob 1736 is attached to one end of the single common axle 1718 to rotate the axle and the first and second set of optical holders 1720, 1722. The axle 1718 will rotate so that a first optical element 1726 in a single optical holder 1720 is in the first optical path in the first barrel 1732 of the optical device 1724. The other optical elements and the other optical holders in the first set are not in the optical path of the first barrel. Simultaneously, the axis 1728 will rotate so that a second optical element 1728 in a single optical holder 1722 is in the second optical path in the second barrel 1734 of the optical device 1724. The other optical elements and the other optical holders in the second set are not in the optical path of the second barrel.

Since the first and second optical elements 1726 and 1728 are identical, both eyes of the viewer will be seeing the outside surroundings through identical optical elements simultaneously, one optical element for each eye of the viewer.

The first and second optical elements 1726 and 1728 are separated on the single common axle by a distance 1730 equal to the distance between the optical path in the first barrel and the optical path in the second barrel of the optical device.

The rotating knob rotates the axle so the first optical element and optical holder rotate out of the first optical path while the adjacent third optical element and optical holder rotates into the first optical path. Simultaneously, the rotating knob rotates the axle so the second optical element and optical holder rotate out of the second optical path while the adjacent fourth optical element and optical holder rotates into the second optical path. The third optical element in the first set will be identical to the fourth optical element in the second set.

The rotating knob and the resulting rotation of the axle will move all of the first set of multiple optical elements into the first optical path of the optical device simultaneously with moving all of the second set of multiple optical elements into the second optical path of the optical device, one pair at a time, and in sequence.

Although not shown in this Figure, as discussed previously, two sets of restraining means can be provided in the optical device to restrain or hold the first and second sets of optical holders not in the optical path from pivoting into the optical path. The restraining means would be flexible enough and positioned in the optical path such that rotating the axle moves the optical holder in the optical path out of the optical path and moves a single optical holder into the optical path with the other optical holders being restrained out of the optical path.

A single revolving door configuration embodiment also can be utilized in a double eyepiece or double barrel optical device.

The common axle is positioned between the two barrels or two eyepieces of the optical device. The multiple optical holders on one side of the common axle will extend into the first barrel while the multiple optical holders on the opposite side of the axle will extend into the second barrel.

Multiple optical elements are arranged in a revolving door configuration around a common axle in a double barrel optical device so that multiple optical elements on opposite sides of the axle are sequentially moved into position in both barrels of the optical device. The optical device can, in series, move multiple optical elements into position. The optical device can be used for multiple optical elements to simulate the optical perspective of multiple creatures.

Multiple optical holders, each optical holder securely holding a single optical element, are arranged circumferentially around a common axle. One side of each optical holder will extend along the longitudinal length of the common axle and will be permanently mounted or pivotably mounted to the axle.

The optical elements are each paired with the optical element on the opposite side of the common axle with a first optical element being identical to a second optical element 180 degrees away on the axle. The optical elements on the common axle will consist of a first series of optical elements in sequence followed by a second series of the same optical elements in the same sequence. There may be intervening optical elements between the first and second optical elements but those intervening optical elements will be paired with other optical elements on the opposite side of the first optical element or with other optical elements on the opposite side of the second optical element.

The first and second optical elements are separated on the common axle by a distance equal to the distance between the optical path in the first barrel and the optical path in the second barrel of the optical device.

An external knob is attached to one end of the single common axle to rotate the axle and the optical elements. The axle will rotate so that the first optical element in a single optical holder is in the first optical path in the first barrel of the optical device. The other optical elements and the other optical holders are not in the first optical path of the first barrel. Simultaneously, the axis will rotate so that the second optical element in a single optical holder, opposite the first optical element, is in the second optical path in the second barrel of the optical device. The other optical elements and the other optical holders are not in the second optical path of the second barrel.

Since the first and second optical elements are identical, both eyes of the viewer will be seeing the outside surroundings through identical optical elements simultaneously, one optical element for each eye of the viewer.

The rotating knob rotates the axle so the first optical element and optical holder rotate out of the first optical path while the adjacent third optical element and optical holder rotates into the first optical path. Simultaneously, the rotating knob rotates the axle so the second optical element and optical holder rotate out of the second optical path while the adjacent fourth optical element and optical holder rotates into the second optical path. The third optical element will be identical an opposite to the fourth optical element.

The rotating knob and the resulting rotation of the axle will move all of the first series of multiple optical elements into the first optical path of the optical device simultaneously with moving all of the second series of multiple optical elements into the second optical path of the optical device, one pair at a time, and in sequence.

Although not shown in this Figure, as discussed previously, two sets of restraining means can be provided in the optical device to restrain or hold the first and second sets of optical holders not in the optical path from pivoting into the optical path.

In this and other embodiments of the present invention, an optical device embodiment with a first and second eyepiece would function the same as this disclosed optical device embodiment of a first and second barrel. The double barrel optical device is merely used as an illustrative example.

Multiple Optical Holders between Two Common Axles

Multiple optical elements can be arranged in a racetrack configuration between two axles in an optical device so that one of the multiple optical elements is sequentially moved into position in the eyepiece or inside the optical device. The optical device can, in series, move multiple optical elements into position. The optical device can be used for multiple optical elements to simulate the optical perspective of multiple creatures.

Figure 17A:
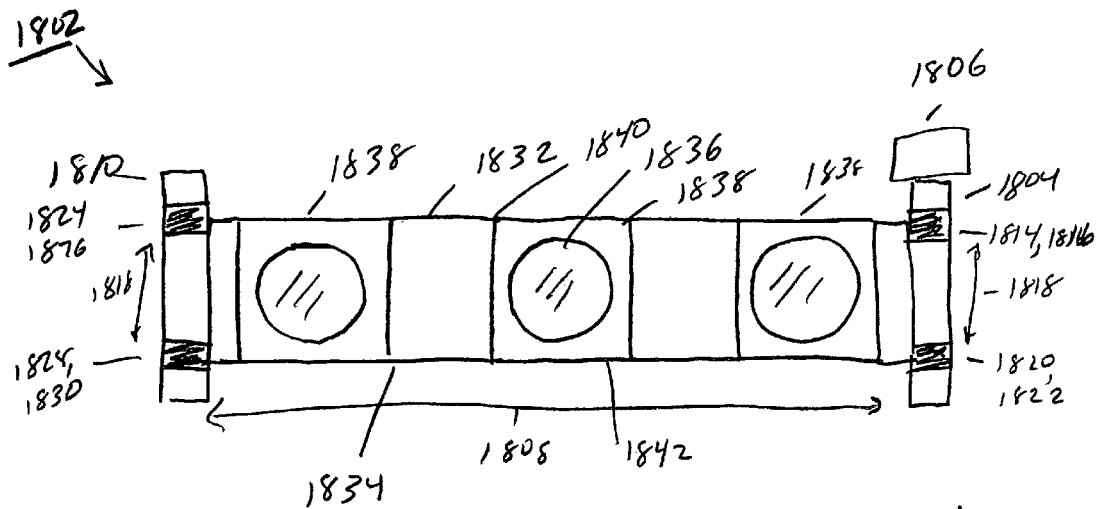
FIG. 17 is a front and side view of multiple optical holders of multiple optical elements on two common axles mounted in a barrel of an optical device.
Figure 17B:
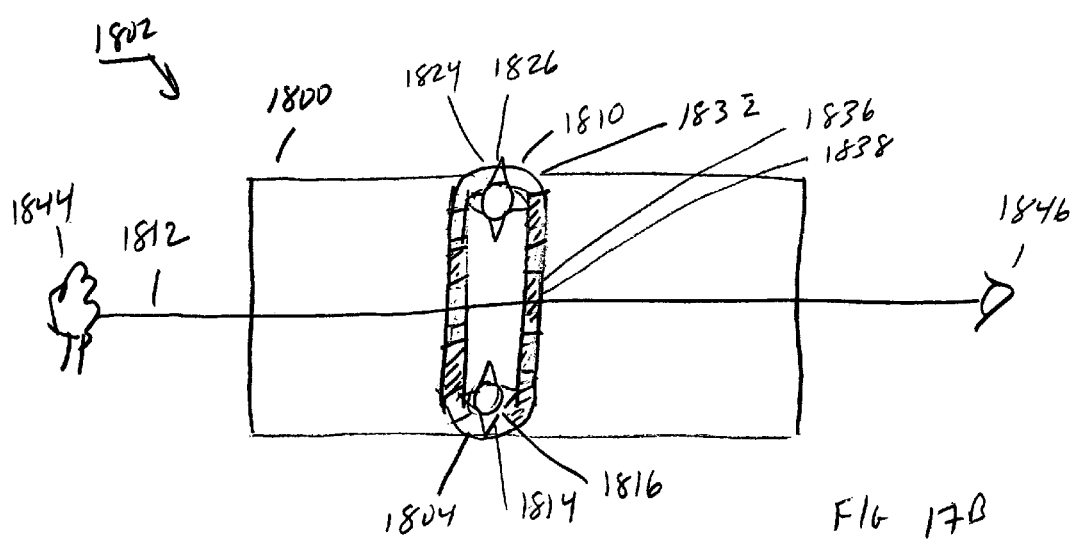

The single barrel 1800 optical device 1802 of FIGS. 17A and 17B will have a first axle 1804 with a control knob 1806 spaced a first distance 1808 apart from the second axle 1810. The first and second axles 1804 and 1810 will be on opposite sides of the optical path 1812 in the optical device 1802. The single barrel is not shown In FIG. 17A for ease of understanding the invention.

The first axle 1804 has a first upper gear 1814 with evenly spaced teeth 1816 spaced a second distance 1818 from a second lower gear 1820 with teeth 1822. The second axle 1810 has a third upper gear 1824 with evenly spaced teeth 1826 spaced the second distance 1818 from a fourth lower gear 1828 with teeth 1830.

A first upper chain 1832 forms a closed loop between the first upper gear 1814 of the first axle 1804 and the third upper gear 1824 of the second axle 1810. The teeth 1816 of the first upper gear 1814 and the teeth 1826 of the third upper gear engage 1824 the openings in the links of the first upper chain 1832.

A second lower chain 1834 forms a closed loop between the second lower gear 1820 of the first axle 1804 and the fourth lower gear 1828 of the second axle. The teeth 1820 of the second lower gear 1820 and the teeth 1830 of the fourth lower gear 1828 engage the openings in the links of the second lower chain 1834.

Multiple optical elements 1836 in multiple optical holders 1838, each optical holder 1838 securely holding a single optical element 1836, will be arranged on the first upper chain 1832 and the second lower chain 1834. The top side 1840 of an optical holder 1838 will be attached to the first upper chain 1832. The bottom side 1842 of the optical holder 1838 will be attached to the second lower chain 1834.

The viewer will turn the control knob 1806. The turning control knob 1806 will rotate the first axle 1804. The rotating first axle 1804 will rotate the first upper gear 1814 and the second lower gear 1820. The teeth 1816 of the rotating first upper gear 1814 and the teeth 1818 of the second lower gear 1820 will engage the first chain 1832 and second chain 1834 respectively, moving the two chains simultaneously and in the same direction. The moving chains 1832 and 1834 will position one optical element 1836 of the multiple optical elements in the optical path 1844 within the optical device 1802. The optical holder 1838 will position the optical element 1836 within the optical device in the optical path 1812 of the light from the outside surrounding environment 1844 to the eye 1846 of the viewer.

The chains 1832 and 1824 and the optical holder 1838 and optical element 1836 are perpendicular to the optical path 1812. The optical holders are staggered arranged along the chains so that only one optical element will be in the optical path at any time.

The optical holders 1838 will circulate on the closed loop of the first and second chains 1832 and 1834. The second axle 1810 and third and fourth gears 1824 and 1828 will passively rotate. The optical holders 1838 do not interfere physically or mechanically with the axles, gears and chains.

By turning the control knob, another optical element of the optical holder can be moved into position in the optical path within the optical device. All of the optical elements, one at a time, in sequence, can be positioned in the optical path within the optical device. The multiple optical elements in the optical device will simulate, one at a time, the optical perspective of multiple creatures to the viewer.

The control knob is external to the optical device. The optical holders, axles, gears and chains are internal to the optical device but can be external if the chains revolve external to the optical device when the optical element is not in the optical path.

The optical elements will be in the optical path on the near side, near the eye of the viewer, and on the far side, near the outside surroundings, within the optical device. The viewer can view the outside surroundings through the optical element when the optical element is in the optical path on the near side or on the far side or both, depending upon whether the optical element is orientation insensitive.

This racetrack configuration embodiment also can be utilized in a single eyepiece optical device. Two racetrack configuration embodiments can be used independently in a double eyepiece or double barrel optical device with one racetrack configuration embodiment for each eyepiece or each barrel.

Alternately, the racetrack configuration embodiment can span the two optical paths of a double barrel or double eyepiece optical device. A double barrel optical device is used for this illustrative example.

The elements of the racetrack configuration for a double barrel optical device are the same as those for a single barrel device.

A first axle with a control knob is on the opposite side of a first optical path in the first barrel and a second optical path in the second barrel from a second axle.

The first axle has a first upper gear with evenly spaced teeth spaced a second distance from a second lower gear with teeth. The second axle has a third upper gear with evenly spaced teeth spaced the second distance from a fourth lower gear with teeth.

A first upper chain forms a closed loop between the first upper gear of the first axle and the third upper gear of the second axle. A second lower chain forms a closed loop between the second lower gear of the first axle and the fourth lower gear of the second axle.

Multiple optical elements will be arranged on the first upper chain and the second lower chain. The top side of an optical element will be attached to the first upper chain. The bottom side of the optical element will be attached to the second lower chain.

The optical elements on the optical holders in the double barrel optical device are each paired, with a first optical element being identical to a second optical element, the third optical element being identical to the fourth optical element and so on. There is an even number of optical elements. Typically each optical element will be paired with one of its adjacent optical elements. The first and second optical elements are separated on the chains by a distance equal to the distance between the optical path in the first barrel and the optical path in the second barrel of the optical device.

The rotating control knob through the axles, gears and chains will move a first optical element into position in the first optical path and simultaneously, move a second optical element into position in the second optical path.

The moving chains will position the first optical element of the optical holder in the optical path within the first barrel of the optical device and position the second optical element of the optical holder in the optical path within the second barrel of the optical device at the same time. Since the first and second optical elements are identical, both eyes of the viewer will be seeing the outside surroundings through identical optical elements simultaneously, one optical element for each eye of the viewer.

The chains will move the first optical element away from the optical path in the first optical holder and move the second identical optical element away from the optical path in the second optical holder. The second optical element will also move away from the first optical path. The chains will move the third optical element into the optical path in the first optical holder and move the adjacent identical fourth optical element into the optical path in the second optical holder.

All of the optical elements, one pair at a time, in sequence, can be positioned in the optical paths in the two barrels within the optical device.

Alternately, there may be intervening optical elements between the first and second optical elements but those intervening optical elements will be paired with other optical elements on the opposite side of the first optical element or with other optical elements on the opposite side of the second optical element.

In this and other embodiments of the present invention, an optical device embodiment with a first and second eyepiece would function the same as this disclosed optical device embodiment of a first and second barrel. The double barrel optical device is merely used as an illustrative example.

The control knob of the present invention can be replaced with a dial, a toggle switch or other switching means known to those of ordinary skill in the art.

Besides the gear drive presented within, other mechanical means known to those of ordinary skill in the art can be used to move the optical holder in the optical device to position the optical elements in the optical path between the outside surrounding environment and the human viewer.

If the optical device is used underwater, then the device, typically the mask or goggles, should be waterproof.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An optical device comprising:
at least one optical element;
an eyepiece or a barrel;
an optical holder for holding said at least optical element;
wherein said optical holder securely but removeably positions said at least optical element adjacent to said eyepiece or one end of said barrel in the optical path of light between outside environment and a human viewer's eye in said eyepiece or said barrel; and wherein said at least optical element simulates the optical perspective of a non-human animal, a reptile, a fish, an insect, a bird or another non-human creature to a human viewer.

2. The optical device of claim 1 wherein said at least optical element is an array of small convex lenses, which simulates the optical perspective of an insect.

3. The optical device of claim 1 wherein said at least optical element is a center magnifying lens with an outer concentric ring of a prism element or a mirror element around said center magnifying lens which simulates the optical perspective of a predator bird.

4. The optical device of claim 1 wherein said at least optical element is a three layer filter, said three layer filter having a blue-sensitive filter, a red-sensitive filter and a green-sensitive filter which simulates the optical perspective of a dog.

5. The optical device of claim 1 wherein said at least optical element is a convex lens, a red-sensitive filter or an infrared-sensitive filter, and an elliptical aperture which simulates the optical perspective of a cat.

6. The optical device of claim 1 wherein said optical device is a telescope, wherein said optical holder positions said at least optical element in the single barrel of said telescope.

7. The optical device of claim 1 wherein said optical device is goggles, wherein a first optical holder positions a first optical element in the first eyepiece of said goggles for viewing by a human viewer's first eye and wherein a second optical holder positions a second optical element in the second eyepiece of said goggles for viewing by a human viewer's second eye.

8. The optical device of claim 1 wherein said optical device is a mask, wherein said optical holder positions said at least optical element in the single eyepiece of said mask.

9. The optical device of claim 1 wherein said optical holder has a flexible member, said flexible member gripping said eyepiece or said one end of said barrel for positioning said at least optical element adjacent to said eyepiece or said barrel.

10. The optical device of claim 1 wherein said optical holder has a first threaded element, said eyepiece or said one end of said barrel has a second threaded element, said first threaded element and said second threaded element screwing together along the threads for positioning said at least optical element adjacent to said eyepiece or said one end of said barrel.

11. The optical device of claim 1 wherein said at least one optical element is multiple optical elements.

12. An optical device comprising:
at least one optical element;
an optical holder for holding said at least optical element:
an eyepiece or a barrel; wherein said optical holder is removeably mounted within said eyepiece or said barrel in said optical device;
wherein said optical holder positions said at least optical element in said eyepiece or in said barrel in the optical path of light between outside environment and a human viewer's eye in said eyepiece or said barrel, and
wherein said at least optical element simulates the optical perspective of a non-human animal, a reptile, a fish, an insect, a bird or another non-human creature to a human viewer.

13. The optical device of claim 12 further comprising
a slot in said eyepiece or barrel for inserting said optical holder in said device, for positioning said at least optical element in the optical path of light between outside environment and a human viewer's eye in said eyepiece or barrel, and for removing said at least optical element from said eyepiece or barrel in said optical device.

14. The optical device of claim 12 further comprising
a first slot in said eyepiece or barrel;
a second slot in said eyepiece or barrel, said second slot being opposite said first slot across said eyepiece or barrel;
said optical holder holding multiple optical elements; and
wherein said optical holder is inserted in said first slot, through said eyepiece or said barrel, and out said second slot, said optical holder positioning one of said multiple optical elements in the optical path of light between outside environment and a human viewer's eye in said eyepiece or barrel, such that all of said multiple optical elements, one at a time, can be positioned in the optical path, and for removing said optical holder from said eyepiece or barrel in said optical device.

15. The optical device of claim 12 wherein said at least one optical element is multiple optical elements.

* * * * *